United States Patent
Perry

(10) Patent No.: US 11,697,061 B2
(45) Date of Patent: *Jul. 11, 2023

(54) SYSTEMS AND METHODS FOR REDUCING HOPS ASSOCIATED WITH A HEAD MOUNTED SYSTEM

(71) Applicant: Sony Interactive Entertainment LLC, San Mateo, CA (US)

(72) Inventor: David Perry, Newport Beach, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/148,353

(22) Filed: Jan. 13, 2021

(65) Prior Publication Data

US 2021/0129012 A1 May 6, 2021

Related U.S. Application Data

(63) Continuation of application No. 14/144,185, filed on Dec. 30, 2013, now Pat. No. 10,905,943.
(Continued)

(51) Int. Cl.
*A63F 13/211* (2014.01)
*G06F 3/14* (2006.01)
(Continued)

(52) U.S. Cl.
CPC .......... *A63F 13/211* (2014.09); *A63F 13/212* (2014.09); *A63F 13/30* (2014.09);
(Continued)

(58) Field of Classification Search
CPC .................... A63F 13/211; A63F 13/92; A63F 2300/8082; G02B 27/017
See application file for complete search history.

(56) References Cited

U.S. PATENT DOCUMENTS 8,184,069 B1 * 5/2012 Rhodes ................ G02B 27/017
348/115
10,244,211 B2 * 3/2019 Smolyanskiy ......... G08G 5/006
(Continued)

OTHER PUBLICATIONS

Ozer, John. "Streaming 101: The Basics—Codecs, Bandwidth, Data Rate and Resolution". Feb. 5, 2009. < https://streaminglearningcenter.com/articles/streaming-101-the-basics-codecs-bandwidth-data-rate-and-resolution.html>. (Year: 2009).*

*Primary Examiner* — Seng H Lim
(74) *Attorney, Agent, or Firm* — Penilla IP, ARC

(57) ABSTRACT

Systems and methods for reducing hops associated with a head mounted display are described. The head mounted display includes a communications circuit for receiving and transmitting interactive media associated with a game program via a network. The interactive media is processed by the game cloud system and streamed directly to the communications circuit of the head mounted display. The head mounted display further includes a user input circuit for receiving an action from a user to generate an input, which includes position and motion detected by the user input circuit. The head mounted display includes a game processing circuit for decoding the interactive media received from the network. The game processing circuit drives a portion of interactivity associated with the game program. The portion of interactivity is generated based on the input.

28 Claims, 13 Drawing Sheets

Related U.S. Application Data

(60) Provisional application No. 61/832,773, filed on Jun. 7, 2013.

(51) Int. Cl.

| | | |
|---|---|---|
| *A63F 13/40* | (2014.01) | |
| *A63F 13/30* | (2014.01) | |
| *G02B 27/01* | (2006.01) | |
| *A63F 13/5255* | (2014.01) | |
| *A63F 13/355* | (2014.01) | |
| *A63F 13/92* | (2014.01) | |
| *A63F 13/212* | (2014.01) | |
| *A63F 13/54* | (2014.01) | |
| *A63F 13/34* | (2014.01) | |
| *A63F 13/31* | (2014.01) | |
| *A63F 13/87* | (2014.01) | |
| *A63F 13/332* | (2014.01) | |
| *A63F 13/358* | (2014.01) | |
| *H04N 13/332* | (2018.01) | |

(52) U.S. Cl.
CPC .............. *A63F 13/31* (2014.09); *A63F 13/34* (2014.09); *A63F 13/355* (2014.09); *A63F 13/40* (2014.09); *A63F 13/5255* (2014.09); *A63F 13/54* (2014.09); *A63F 13/87* (2014.09); *A63F 13/92* (2014.09); *G02B 27/017* (2013.01); *G06F 3/14* (2013.01); *A63F 13/332* (2014.09); *A63F 13/358* (2014.09); *A63F 2300/538* (2013.01); *A63F 2300/8082* (2013.01); *G02B 2027/014* (2013.01); *G09G 2350/00* (2013.01); *H04N 13/332* (2018.05)

(56) References Cited

U.S. PATENT DOCUMENTS

| | | | |
|---|---|---|---|
| 10,974,136 B2* | 4/2021 | Perry | G06F 3/012 |
| 11,089,280 B2* | 8/2021 | Castleman | H04L 65/611 |
| 2011/0214082 A1* | 9/2011 | Osterhout | G02B 27/017 |
| | | | 715/773 |
| 2012/0224070 A1* | 9/2012 | Burroff | H04N 5/23206 |
| | | | 348/E5.025 |
| 2012/0320169 A1* | 12/2012 | Bathiche | G02B 27/017 |
| | | | 348/53 |
| 2013/0083003 A1* | 4/2013 | Perez | G06T 11/20 |
| | | | 345/419 |
| 2013/0117377 A1* | 5/2013 | Miller | G06F 3/011 |
| | | | 709/205 |
| 2013/0125027 A1* | 5/2013 | Abovitz | G06F 3/017 |
| | | | 715/757 |
| 2013/0147686 A1* | 6/2013 | Clavin | G02B 27/017 |
| | | | 345/8 |
| 2013/0194305 A1* | 8/2013 | Kakuta | G06T 19/006 |
| | | | 345/633 |
| 2013/0208234 A1* | 8/2013 | Lewis | G06F 3/015 |
| | | | 351/158 |
| 2013/0242262 A1* | 9/2013 | Lewis | G06F 3/013 |
| | | | 351/209 |
| 2014/0128161 A1* | 5/2014 | Latta | A63F 9/24 |
| | | | 463/42 |
| 2014/0354637 A1* | 12/2014 | Reiner | G06T 17/10 |
| | | | 345/420 |
| 2015/0170418 A1* | 6/2015 | Flynn | G06F 3/04815 |
| | | | 345/633 |
| 2015/0227795 A1* | 8/2015 | Starner | G06T 7/254 |
| | | | 348/143 |
| 2015/0260474 A1* | 9/2015 | Rublowsky | A63F 13/837 |
| | | | 434/16 |
| 2016/0157282 A1* | 6/2016 | Ye | H04N 5/23206 |
| | | | 455/556.1 |
| 2016/0357261 A1* | 12/2016 | Bristol | G06F 1/1686 |
| 2021/0129012 A1* | 5/2021 | Perry | A63F 13/87 |

\* cited by examiner

SYSTEMS AND METHODS FOR REDUCING HOPS ASSOCIATED WITH A HEAD MOUNTED SYSTEM

CLAIM OF PRIORITY

The present patent application is a continuation of and claims the benefit of and priority, under 35 USC § 120, to U.S. patent application Ser. No. 14/144,185, filed on Dec. 30, 2013, and titled "SYSTEMS AND METHODS FOR REDUCING HOPS ASSOCIATED WITH A HEAD MOUNTED SYSTEM", which claims the benefit of and priority, under 35 U.S.C. § 119(e), to U.S. Provisional Patent Application No. 61/832,773, filed on Jun. 7, 2013, and titled "Systems and Methods for Reducing Hops Associated with a Head Mounted System", both of which are hereby incorporated by reference herein in their entirety.

FIELD

The present disclosure relates to methods and systems for reducing hops associated with a head mounted system.

BACKGROUND

Generally, a video game console is used to play a game. For example, a user usually purchases a controller and the console to play the game. The console may be connected to the Internet. The console is powered on and the controller is operated by the user to play a game via the console and the Internet. However, a number of hops, e.g., number of network devices, etc., that game data goes through to facilitate game play may slow the play of the game. For example, the user may have to wait for graphics to be downloaded to the console from the Internet to play certain stages of the game.

It is in this context that embodiments described in the present disclosure arise.

SUMMARY

Embodiments described in the present disclosure provide systems and methods for reducing a number of hops associated with a head mounted system are described herein.

Broadly speaking, in various embodiments, the systems and methods allow game play in which media data is streamed to a head mounted display from a network by bypassing a router between the head mounted display and the network. The lack of use of the router reduces a number of hops between the head mounted display and a game cloud that executes a game program to allow the user to play the game.

In some embodiments, a head mounted display used for game play via a game cloud system is described. The head mounted display includes a communications circuit for receiving and transmitting interactive media associated with a game program via a network. The interactive media is processed by the game cloud system and streamed directly to the communications circuit of the head mounted display. The head mounted display further includes a user input circuit for receiving an action from a user to generate an input, which includes position and motion detected by the user input circuit. The head mounted display includes a game processing circuit for decoding the interactive media received from the network. The game processing circuit drives a portion of interactivity associated with the game program. The portion of interactivity is generated based on the input.

In several embodiments, a method for game play via a game cloud system is described. The method includes directly streaming interactive media associated with a game program via a network. The interactive media is processed by the game cloud system. The operation of directly streaming is performed by a head mounted display. The method further includes receiving an input including position and motion detected by the head mounted display, decoding the interactive media received from the network, and driving a portion of interactivity associated with the game program. The portion of interactivity is generated based on the input.

In various embodiments, a non-transitory computer-readable medium for having stored thereon computer executable instructions for game play via a game cloud system is described. The computer executable instructions when executed by a processor of a computer directly stream interactive media associated with a game program via a network. The interactive media is processed by the game cloud system. Moreover, the computer executable instructions when executed by the processor receive an input from the head mounted display. The input includes position and motion detected by the head mounted display. The computer executable instructions when executed by the processor decode the interactive media received from the network and drive a portion of interactivity associated with the game program. The portion of interactivity is generated based on the input.

Other aspects described will become apparent from the following detailed description, taken in conjunction with the accompanying drawings, illustrating by way of example the principles of embodiments described in the present disclosure.

BRIEF DESCRIPTION OF THE DRAWINGS

Various embodiments described in the present disclosure may best be understood by reference to the following description taken in conjunction with the accompanying drawings in which.

DETAILED DESCRIPTION

Figure 1A:
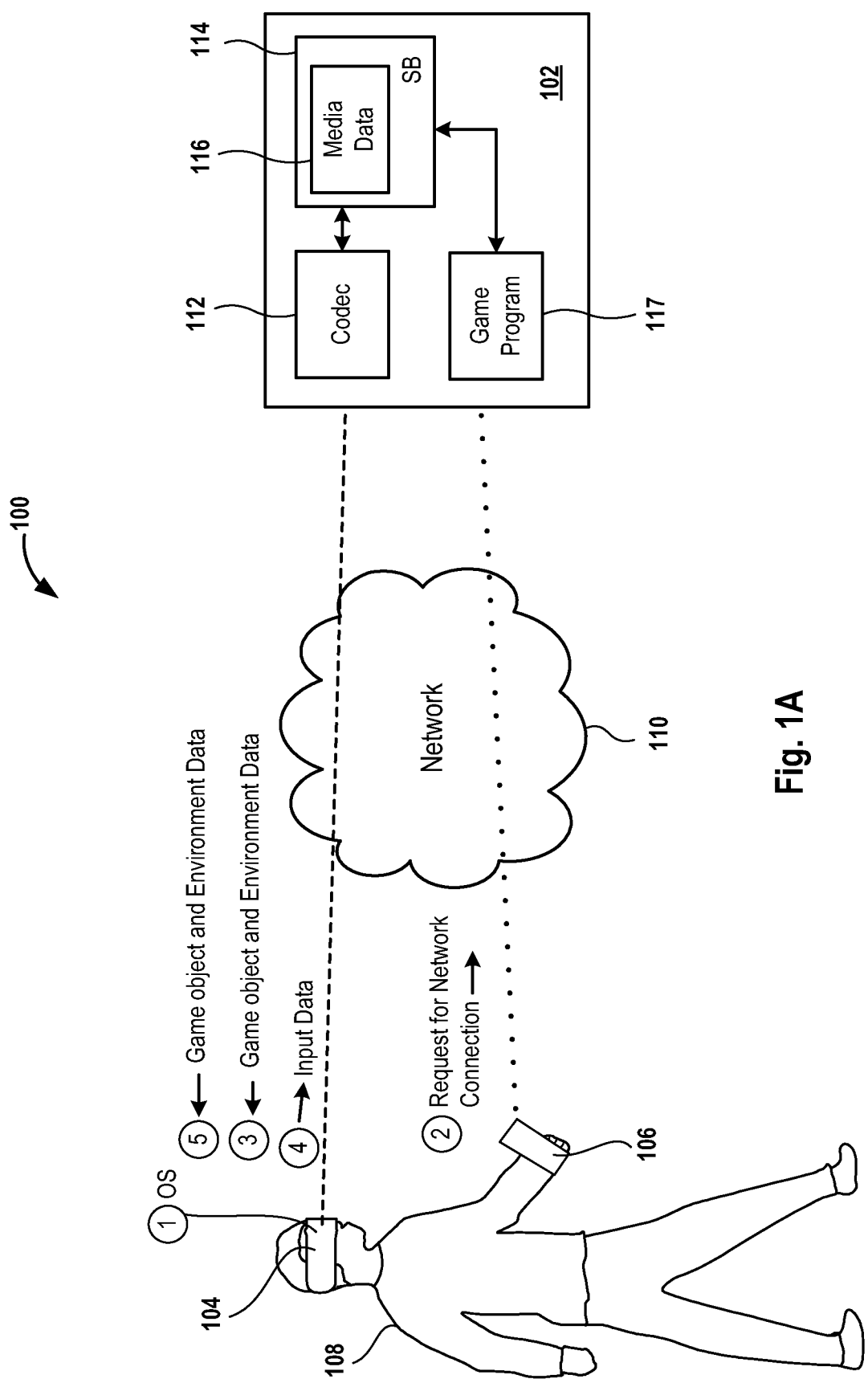
FIG. 1A is a diagram of a system for reducing a number of hops between a game cloud and a head mounted display (HMD) or a hand-held controller (HHC), in accordance with one embodiment described in the present disclosure.

Systems and methods for reducing a number of hops associated with a head mounted system are described. For example, a network device, e.g., a router, a repeater, a hub, a computer, a console, etc., adds a hop to data that is being transferred via the network device. One or more network devices may be located between a head mounted display (HMD) and a network and/or between a hand-held controller (HHC) and the network. The hop may be added as a result of reception of the data by the network device from another device, buffering of the data by the network device, analyzing the data, and resending of the data to another device by the network device. The systems and methods reduce a number of the network devices between the HMD and the network and/or between the HHC and the network. The reduction in the number of network devices reduces latency, e.g., lag time, time of buffering data, time of receiving data, time of analyzing data, time of resending data, etc. When the latency is reduced, the HMD and/or the HMC is used to display intense graphics that is received from a game cloud via the network with minimal latency. It should be noted that various embodiments described in the present disclosure may be practiced without some or all of these specific details. In other instances, well known process operations have not been described in detail in order not to unnecessarily obscure various embodiments described in the present disclosure.

In some embodiments, the system includes a computer, an HHC, and an HMD. In various embodiments, the computer may be a special purpose computer, a gaming console, a mobile phone, a tablet, or other such device which executes one or more portions of an interactive game program that is rendered on a display. In these embodiments, any remaining portions of the interactive game program are executed in a game cloud system, e.g., one or more virtual machines (VMs). In some embodiments, the game cloud system includes a number of servers that execute a game program to generate a gaming environment on a gaming device, the HMD, a television, a computer screen, etc. For example, a hypervisor is executed on top of physical resources, e.g., processors, memory devices, servers, etc., to execute a number of operating systems and a number of computer software applications to generate data, which is further used to generate a gaming environment on the HMD. Examples of gaming consoles include those manufactured by Sony Computer Entertainment™, Inc. and other manufacturers. The interactive game program may be a multi-user game program that is played by multiple users or a single user game program that is played by a user with a computer.

In several embodiments, all portions of the interactive game program are executed on the game cloud system or on the computer.

In various embodiments, the interactive game program is executed to generate an immersive environment within the HMD. For example, the immersive environment is created by a processor in which a user immerses himself/herself. The immersive environment makes a user feel as if he/she is a part of a virtual world that is created by a processor. The immersive environment separates a user mentally from the real world and brings the user into a virtual world to provide the user a gaming experience. In several embodiments, a processor generates the immersive environment that is displayed within the HMD to create a feel in the user that a virtual world of the immersive environment is real. In some embodiments, media data or additional media data, as described herein, includes data used to generate an immersive environment.

The HMD is a device worn on a head of a user or as part of a helmet that has a small display optic, e.g., lens, glass, etc., in front of one or each eye of the user. In some embodiments, one scene, e.g., virtual scene, augmented virtual reality scene, etc., is displayed on a display screen of the HMD even though two optics are used for the two eyes. Both the eyes see one scene.

In some embodiments, the HMD is capable of receiving and rendering video output from the computer. In various embodiments, the HHC and/or the HMD communicates wirelessly with the computer, as this provides for greater freedom of movement of the HHC and/or the HMD than a wired connection.

The HHC may include any of various features, such as, for example, buttons, a joystick, directional pad, trigger, hand gestures, touchpad, touchscreen, or other types of input mechanisms, etc., for providing input to the interactive game program. One example of the HHC is the Sony Dualshock 4 controller manufactured by Sony Computer Entertainment, Inc. Other examples of the HHC include controllers manufactured by other entities and having any model number and any version number.

Furthermore, the HHC may be a motion controller that enables the user to interface with and provide input to the interactive game program by moving the motion controller. One example of the motion controller is the PlayStation Move™ controller, manufactured by Sony Computer Entertainment™, Inc.

Similarly, the HMD may include a user input circuit that enables the user to interface with and provide input to the interactive game program by moving the HMD. Various technologies may be employed to detect a position and movement of the motion controller and/or the HMD. For example, the motion controller and/or the user input circuit may include various types of inertial sensor circuits, such as accelerometers, gyroscopes, and magnetometers. In some embodiments, an accelerometer is a 6-axis low latency accelerometer. In several embodiments, the motion controller and/or the HMD can include one or more fixed reference objects, e.g., light emitting diodes (LEDs), colored points, light reflectors, markers, retroreflective material, pre-defined shape, pre-defined color, pre-defined object, barcode, tags, quick response (QR) code, etc., and images of the fixed reference objects are captured by one or more digital cameras. In some embodiments, a digital camera includes a video camera that further includes a single Charge Coupled Device (CCD), an LED indicator, and hardware-based real-time data compression and encoding apparatus so that compressed video data may be transmitted in an appropriate format such as an intra-image based motion picture expert group (MPEG) standard. The position and movement of the motion controller and/or the HMD can then be determined through analysis of the images captured by the one or more digital cameras.

FIG. 1A is a diagram of an embodiment of a system 100 for reducing a number of hops between a game cloud 102 and an HMD 104 or an HHC 106. In some embodiments, the game cloud 102 is referred to herein as a game cloud system. In various embodiments, the HMD 104 is placed by a user 108 over his/head so that lenses of the HMD 104 are located in front of his/her eyes in a similar manner in which the user 108 would put on a helmet. In several embodiments, the HMD 104 is worn like glasses, e.g., prescription glasses, goggles, etc. In a number of embodiments, the HMD 104 covers both eyes of the user 108. The HHC 106 is held by the user 106 in his/her hands.

In various embodiments, instead of the HHC 106, hands of the user 106 are used to provide gestures, e.g., hand gestures, finger gestures, etc., to the HMD 104. For example, a digital camera within the HMD 104 captures images of the gestures and a processor within the HMD 104 analyzes the gestures to determine whether a game displayed within the HMD 104 is affected by the gestures.

As used herein, a processor may be a microprocessor, a programmable logic device (PLD), an application specific integrated circuit (ASIC), or a combination thereof.

The system 100 includes a network 110, which may be a local area network (LAN), a wide area network (WAN), or a combination thereof. Examples of the network 110 include the Internet, an Intranet, or a combination thereof. In some embodiments, the network 110 uses a transmission control protocol (TCP)/Internet Protocol (IP) or a user datagram protocol/IP (UDP/IP) to communicate media data via the network 110 between the game cloud 102 and the HMD 104 or the HHC 106. In various embodiments, the network 110 uses the Ethernet protocol, the TCP/IP protocol, or both the protocols, to communicate media data via the network 110 between the game cloud 102 and the HMD 104 or the HHC 106.

The game cloud 102 includes a coder/decoder (codec) 112 and a stream buffer 114. The stream buffer 114 stores a stream of media data 116, which is generated upon execution of a game program 117. The media data 116 includes virtual environment data, virtual game object data, a combination thereof, etc. In a variety of embodiments, the virtual environment data is rendered to generate a virtual environment of a game and the virtual game object data is rendered to generate one or more virtual game objects, e.g., virtual game characters, virtual points, virtual prizes, game interface, etc. In some embodiments, a virtual environment of a game includes a virtual game object. Examples of a virtual environment include a virtual geographic region, e.g., a virtual city, a virtual road, a virtual lake, a virtual ocean, etc. The game program 117 is an example of the interactive game program and is executed by one or more servers of the game cloud 102. An example of the codec 112 includes a compressor/decompressor. For example, the codec 112 codes/decodes media data 116. Examples of compression include lossy compression, lossless compression, etc. In some embodiments, the codec 112 performs packetization and depacketization, and performs coding and decoding. In these embodiments, the codec 112 includes the stream buffer 114.

The user 108 uses the HMD 104 to access an operating system (OS) that is executed by the processor of the HMD 104. For example, the user 108 turns on via a button the HMD 104 and the processor of the HMD 104 executes the OS.

In some embodiments, the OS allows the HMD 104 to access the network 110. For example, when the user 108 selects a network access application, e.g., a network access icon, a network access symbol, etc., that is executed by the processor of the HMD 104 on top of the OS, the network access application provides a list of networks to a microcontroller of the HMD 104 to display to the user 108. The user 108 uses the user input circuit to select one of the networks for accessing the network 110. For example, the user 108 performs one or more head actions, e.g., head tilting, winking, gazing, staring, nodding, shaking, etc., which are detected by the user input circuit to generate an input for selecting one of the networks. As another example, the user 108 selects a button on the HHC 106 to select one of the networks and the selection is communicated from the HHC 106 to the HMD 104 by a communications circuit of the HHC 106. Examples of a communications circuit include a transceiver, a transmit/receive circuitry, a network interface controller, or a combination thereof, etc. The network access application also requests a password, e.g., a security key, a passcode, etc., from the user 108 to access the network 110. Upon authenticating that the password is valid, the network access application allows access of the network 110 to the user 108.

Once the network 110 is accessed, the OS allows the HMD 104 to access the game program 117. For example, when the user 108 selects a game access application, e.g., a game access icon, a game access symbol, etc., that is executed by the processor of the HMD 104 on top of the OS, the game access application requests access to the game program 117 via the network 110. For example, the user 108 performs the one or more head actions, which are detected by the user input circuit to generate an input for selecting the game access application. As another example, the user 108 selects a button on the HHC 106 to select the game access application and the selection is communicated from the HHC 106 to the HMD 104 by the communications circuit of the HHC 106.

Upon obtaining access to the game program 117 via the network 110, the microcontroller of the HMD 104 displays a game on a display screen of the HMD 104. In some embodiments, the display screen of the HMD 104 is a high performance screen to reduce blur when the HMD 104 is moved rapidly. The user 108 performs one or more of the head actions and each head action triggers the user input circuit to generate an input, which may be used to play the game. In some embodiments, the user 108 performs selects one or more buttons of the HHC 106 using his/her hand and each hand action, e.g., pressing a finger, moving a finger, rotating a finger, shifting up a finger, shifting down a finger, shifting right a finger, shifting left a finger, etc., triggers the HHC 106 to generate an input, which may be used to play the game.

In some embodiments, the game access application requests a username and/or a password from the user 108 to access the game program 117. Upon receiving authentication from the game cloud 102 that the username and/or the password is valid, the game access application allows access of the game program 117 to the user 108. In several embodiments, the user 108 provides the username and/or the password by performing one or more of the hand actions and/or performing one or more of the head actions.

In various embodiments, instead of accessing the game access application, the user 108 requests access to a web page upon accessing the network 110 and the web page allows the user 108 access to the game program 117. For example, the user 108 selects a web browser application via the user input circuit by performing one or more of the head actions or via the HHC 106 by performing one or more of the hand actions to access a web page. Upon accessing the web page, the user 108 plays a game displayed on the web page. The game is displayed when the game program 117 is executed on the game cloud 102.

In some embodiments, a username and/or password of the user 108 is authenticated before accessing a web page to play a game that is displayed when the game program 117 is executed on the game cloud 102. The username and/or the password is authenticated in a similar manner to that described above when the user 108 accesses a game via the game access application.

When the game program 117 is accessed, the codec 112 encodes, e.g., compresses, etc., a digital data stream of the media data 116 for sending a stream of encoded media data to the HMD 104 via the network 110. In some embodiments, a digital data stream of the encoded media data is in the form of packets for sending via the network 110.

The HMD 104 receives the digital data stream of the encoded media data via the network 110 from the codec 112 and the digital data stream is processed, e.g., decoded, depacketized, etc., and rendered to display a game on the display screen of the HMD 104. When a game is displayed on the display screen of the HMD 104, one or more inputs are received from the HMD 104 and/or the HHC 106. For example, the user 108 performs one or more of the head actions upon wearing the HMD 104. As another example, the user 108 performs one or more of the hand actions, e.g., press of a button, movement of a joystick, hand gesture, finger gesture, a combination thereof, etc., and when the one or more hand actions are performed, the HHC 106 generates input data that is converted into input signals by the communications circuit of the HHC 106 for sending to a communications circuit of the HMD 104. The input signals are converted from an analog form to a digital form by a communications circuit of the HMD 104 to generate input data, and the input data is packetized and encoded by the HMD 104 and sent via the network 110 to the codec 112.

In some embodiments, the game program 117 maps input data that is generated based on the one or more head actions with input data that is generated based on the one or more hand actions to determine whether to change a state of a game that is displayed on the HMD 104. For example, when an input indicating a head tilt is received via the network 110 with an input indicating a press of a button on the HHC 106, the game program 117 determines to change a state of a game. Otherwise, the game program 117 determines not to change a stage of a game.

Input data of the inputs generated based on the one or more head actions and/or the one or more hand actions is packetized and encoded by the HMD 104 and sent as a stream of encoded input data via the network 110 to the codec 112. For example, when the input data is not sent via a router, the input data is sent directly from the HMD 104 via the network 110 to the game cloud 102. The router may be placed between the HMD 104 and the network 110 to route, e.g., direct, send, etc., to an addressed device, etc., data between the HMD 104 and the network 110.

The codec 112 decodes, e.g., decompresses, etc., the stream of encoded input data received via the network 110 from the HMD 104 and the decoded input data is buffered in the stream buffer 114 for depacketizing and sending to the game program 117. One or more servers of the game cloud 102 depacketizes the stream of decoded input data and sends the input data to the game program 117. In some embodiments, the game cloud 102 performs the depacketization first and then performs the decoding.

Based on the input data, the game program 117 generates additional media data that is packetized by one or more servers of the game cloud 102 to generate a stream of additional media data. The stream of additional media data is stored in the stream buffer 114, encoded by the codec 112, and sent as a stream of encoded additional media data via the network 110 to the HMD 104. In some embodiments, the additional media data is encoded first and then packetized before sending the additional media data via the network 110 to the HMD 104. The HMD 104 receives the stream of encoded additional media data, depacketizes the stream, and decodes the encoded additional media data to provide the additional media data to the microcontroller of the HMD 104.

In some embodiments, a gaming environment includes the media data 116, the additional media data, or a combination thereof.

The microcontroller of the HMD 104 changes a display of a game that is executed by the game program 117 based on the additional media data. For example, when the user 108 nods, an avatar of the user 108 also nods in a virtual world of a game that is generated by executing the game program 117. As another example, when the user 108 shakes his/her head in denial, an avatar of the user 108 also shakes its head in denial in a virtual world of a game that is generated by executing the game program 117. As another example, when the user 108 looks at a virtual game character displayed on the display screen of the HMD 104, the virtual game character looks back at the user 108. When the user 108 looks away from the virtual game character, the virtual game character looks away from the user 108. Moreover, in this example, an internal digital camera of the HMD 104 captures an image of eyes or of a head location of the user 108. Based on a gaze of the eyes or of the head location, the game program 117 changes a location of eyes of the virtual game character. It should be noted that the input data of the inputs generated based on the one or more head actions and/or the one or more hand actions changes a state of the game. In some embodiments, a display of a game is referred to herein as a portion of interactivity associated with the game program 117.

In various embodiments, instead of communicating the input data that is generated based on the one or more hand actions from the HHC 106 to the HMD 104, the input data is communicated directly from the HHC 106 via the network 110 to the codec 112. For example, the input data is communicated directly from the HHC 106 via the network 110 to the codec 112 when the input data is not communicated via a router (not shown) between the HHC 106 and the network 110. The input data that is generated based on the one or more hand actions from the HMD 104 is communicated by the HHC 106 in a similar manner in which the input data is communicated by the HMD 104. For example, the input data that is generated based on the one or more hand actions from the HMD 104 is encoded and packetized by the HHC 106 and sent as a stream of encoded input data via the network 110 to the codec 112.

It should be noted that a lack of a router (not shown) between the HMD 104 and the network 110 reduces a number of hops between the network 110 and the HMD 104. In embodiments in which the router is lacking, interactive media, e.g., media data 116, the additional media data, etc., is streamed directly to a wireless access card (WAC) of the HMD 104 by the codec 112 of the game cloud 102 via the network 110. Moreover, in these embodiments, interactive media, e.g., input data, etc., is streamed directly by the WAC to the codec 112 of the game cloud 102 via the network 110.

The reduction in the number of hops saves time associated with the router. For example, the router receives data from another network device, buffers the data, analyzes the data, and resends the data to another network device. The time of receiving the data, buffering the data, analyzing the data, and resending the data is saved when the data is transferred between the HMD 104 and the game cloud 102 via the network 110 by bypassing the router. Also, the time of receiving the data, buffering the data, analyzing the data, and resending the data is saved when the data is transferred between the HHC 106 and the game cloud 102 via the network 110 by bypassing the router.

Similarly, when a computer, e.g., console, mobile device, etc. is not used between the HMD 104 or the HHC 104 and the network 110, time associated with reception of, storing, analysis, and resending the data is saved.

Figure 1B:
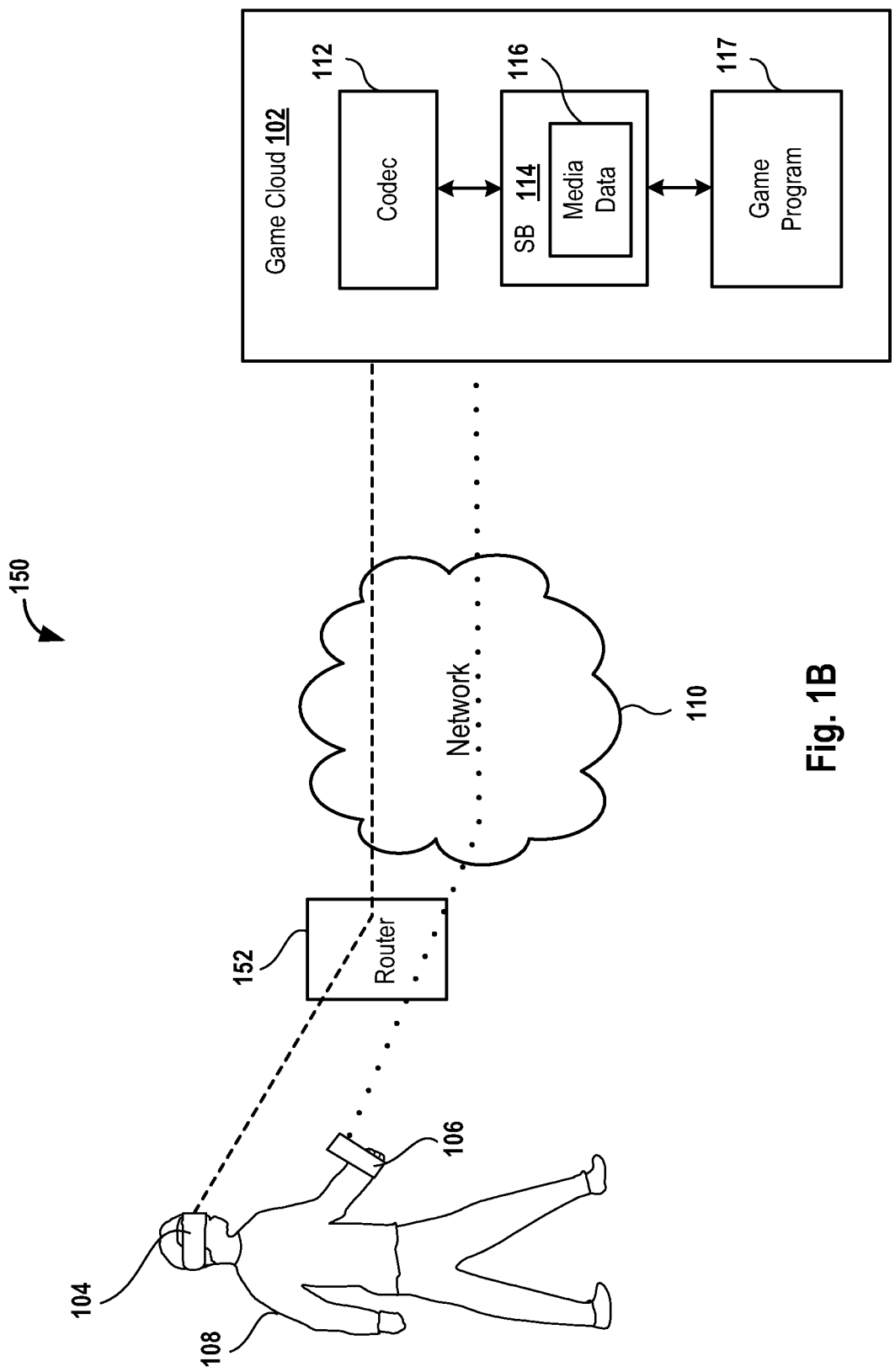
FIG. 1B is a diagram of a system for transferring data between the HMD or the HHC and the game cloud via a network and a router, in accordance with one embodiment described in the present disclosure.

FIG. 1B is a diagram of an embodiment of a system 150 for transferring data between the HMD 104 or the HHC 106 and the game cloud 102 via the network 110 and a router 152. The system 150 is similar to the system 100 (FIG. 1A) except that the system 150 includes the router 152 between the HMD 104 and the network 110. The router 152 is also located between the HHC 106 and the network 110.

The HMD 104 is coupled to the router 152 via a wireless connection, e.g., a Bluetooth connection, a Wi-Fi connection, etc. Moreover, the HHC 106 is coupled to the router 152 via a wireless connection, e.g., a Bluetooth connection, a Wi-Fi connection, etc. In some embodiments, the router 152 is coupled to the network 110 via a wired connection.

The system 150 operates in a similar manner to that of the system 100 (FIG. 1A) except that a stream of encoded data is sent from the HMD 104 or the HHC 106 to the router 152. The router 152 routes, e.g., directs, etc., the stream of encoded data to a path in the network 110 to facilitate sending the stream to the codec 112. The router 152 uses an IP address and/or a media access layer (MAC) address of the codec 112 to route the stream of encoded data to the codec 112. In some embodiments, the router 152 determines a network path of the network 110 based on one or more network traffic factors, e.g., packet traffic on the network path, congestion on the network path, etc.

The router 152 receives a stream of encoded data from the game cloud 102 via the network 110 and routes the stream of encoded data to the HMD 104. For example, the router 152 routes the stream of encoded data received from the game cloud 102 via the network 110 to the HMD 104 based on an IP address and/or a MAC address of the HMD 104.

Figure 1C:
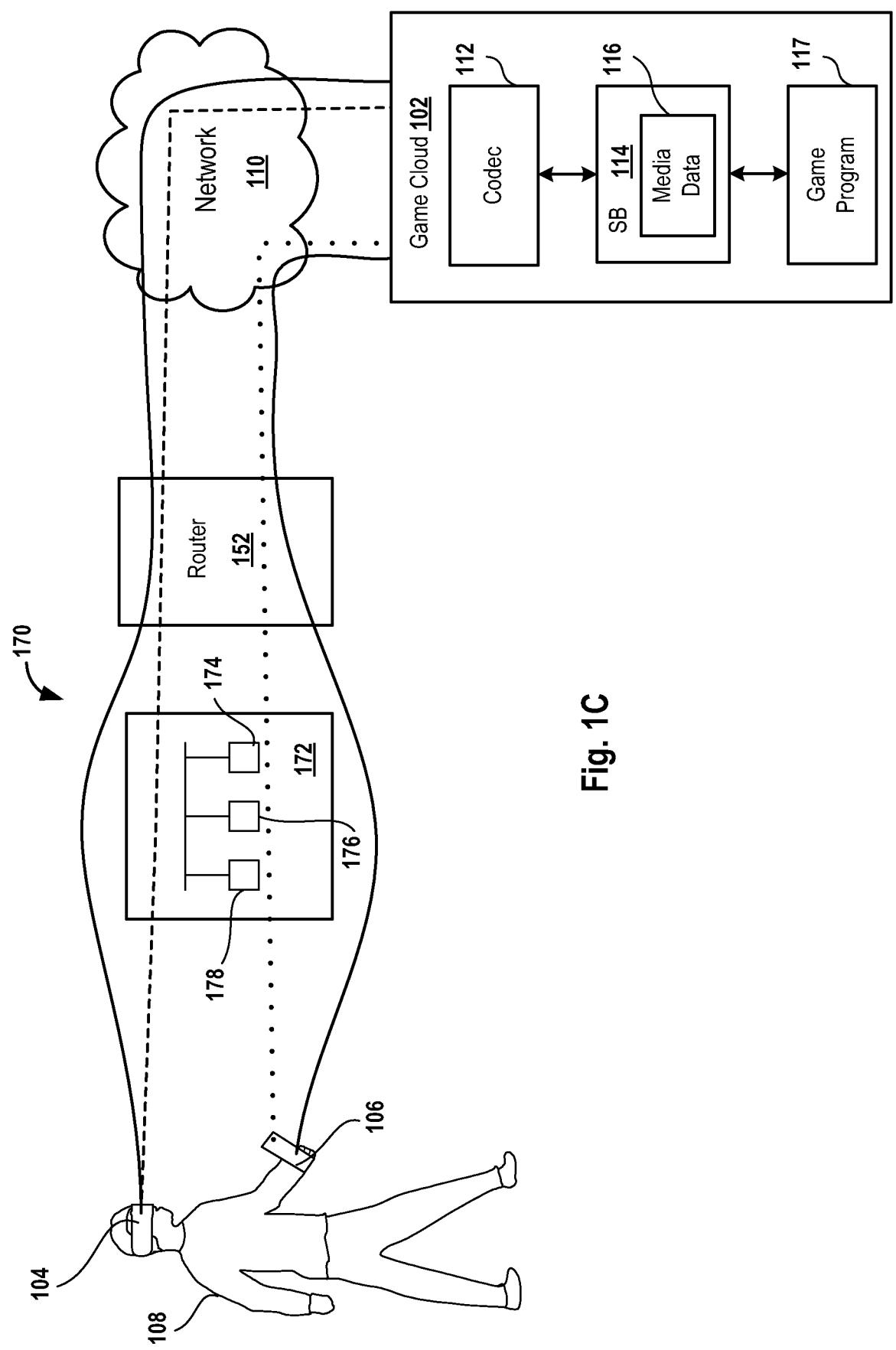
FIG. 1C is diagram of a system for using a console for communicating media data and for using or not using the router to communicate input data and/or media data, in accordance with one embodiment described in the present disclosure.

FIG. 1C is a diagram of an embodiment of a system 170 for using a computer 172 for communicating media data and for using or not using the router 152 to communicate input data and/or media data.

In some embodiments, instead of on the HMD 104, a list of wireless networks is presented on a display screen that is coupled to the computer 172 or located within the computer 172. For example, when the computer 172 is a mobile phone, the computer 172 includes a display screen for displaying the list of wireless networks. As another example, when the computer 172 is coupled to a television display screen, the list of wireless networks is displayed on the display screen. In these embodiments, the list of wireless networks is accessed when a processor 176 of the computer 172 executes the wireless access application stored within a memory device of the computer 172. The processor 176 executes the wireless access application when the user 108 accesses the wireless access application via the HMD 104 or the HHC 106 by performing the one or more head actions and/or one or more hand actions. Input data generated based on the one or more head actions and/or the one or more hand actions is sent from the communications circuit of the HMD 104 or the HHC 106 to the computer 172. When the processor 176 of the computer 172 receives the input data, the wireless access application is executed to generate the list of wireless networks.

The computer 172 includes a network interface controller (NIC) 174 that requests a portion of the game program 117 from the game cloud 102. Examples of a NIC include a network interface card and a network adapter. The portion of the game program 117 is encoded by the codec 112 and streamed via the network 110 to the NIC 174 of the computer 172. The processor 176 of the computer 172 executes the portion of the game program 117 to generate media data, which is sent from a communications circuit 178, e.g., transceiver, a Transmit/Receive circuit, a network interface controller, etc., to the HMD 104 for display on the display screen of the HMD 104. The communications circuit of the HMD 104 receives the media data from the computer 172 and sends the media data to the microcontroller of the HMD 104 for display on the display screen of the HMD 104.

Moreover, the communications circuit 178 of the computer 172 receives input data from the HMD 104 and/or the HHC 106 that is generated based on the one or more head actions and/or the one or more hand actions and sends the input data to the processor 176. In response to the input data, the processor 176 executes the portion of the game program 117 that is stored within the computer 172 to generate media data, which is sent from the communications circuit 178 to the communications circuit of the HMD 104. The media data is sent to the communications circuit of the HMD 104 to change virtual game objects and/or virtual environment of a game displayed by execution of the game program 117. When the virtual game objects and/or virtual environment changes, a game state of the game displayed by execution of the game program 117 changes.

In some embodiments, the game state is sent by the NIC 174 of the computer 172 via the router 152 and the network 110 to the game cloud 102 to inform one or more servers of the game cloud 102 of the game state.

In various embodiments, media data, e.g., the media data 116, the additional media data, etc., is sent from the codec 112 via the network 110 and the router 152 to the HMD 104 until a portion of the game program 117 is downloaded to the computer 172 from the game cloud 102. For example, initially, the user 108 uses the game access application to access the game program 117. During the access of the portion of the game program 117, the media data 116 is sent from the codec 112 via the network 110 and the router 152 to the HMD 104 for display on the display screen of the HMD 104. During the time of access of media data, e.g., the media data 116, the additional media data, etc., from the game cloud 102 for display on the HMD 104, the NIC 174 of the computer 172 downloads a portion of the game program 117 from the game cloud 102 via the network 110 and the router 152.

In some embodiments, when a portion of the game program 117 is accessed by the console 172, media data, e.g., the media data 116, the additional media data, etc., is sent from the codec 112 via the network 110 to the HMD 104 for display on the display screen of the HMD 104. In these embodiments, the router 152 is bypassed to reduce a number of hops. During the time of access of media data, e.g., the media data 116, the additional media data, etc., from the game cloud 102 for display on the HMD 104 after bypassing the router 152, the NIC 174 of the computer 172 downloads a portion of the game program 117 from the game cloud 102 via the network 110 and the router 152.

In a number of embodiments, a portion of input data generated based on the one or more head actions and/or one or more hand actions is sent from the HMD 104 via the router 152 and the network 110 to the codec 112 of the game cloud 102 and the remaining portion of the input data is sent from the communications circuit of the HMD 104 to the communications circuit 178 of the computer 172.

In various embodiments, a portion of input data generated based on the one or more hand actions is sent from the communications circuit of the HHC 106 via the router 152 and the network 110 to the codec 112 of the game cloud 102 and the remaining portion of the input data is sent from the communications circuit of the HHC 106 to the communications circuit 178 of the computer 172.

In some embodiments, a portion of input data generated based on the one or more head actions and/or one or more hand actions is sent from the HMD 104 via the network 110 to the codec 112 of the game cloud 102 and the remaining portion of the input data is sent from the communications circuit of the HMD 104 to the communications circuit 178 of the computer 172. In these embodiments, the router 152 is bypassed.

In several embodiments, a portion of input data generated based on the one or more hand actions is sent from the communications circuit of the HHC 106 via the network 110 to the codec 112 of the game cloud 102 and the remaining portion of the input data is sent from the communications circuit of the HHC 106 to the communications circuit 178 of the computer 172. In these embodiments, the router 152 is bypassed.

In various embodiments, media data, e.g., the media data 116, the additional media data, etc., that is generated by executing the game program 117 is sent from the codec 112 of the game cloud 102 via the network 110 and the router 152 to the HMD 104 for rendering of the media data to display a game on the display screen of the HMD 104 and media data that is generated by execution of a portion of the game program 117 by the processor 176 of the computer 172 is sent from the communications circuit 178 of the computer 172 to the HMD 104 for display of a game on the display screen. In these embodiments, the game cloud 102 and the computer 172 have synchronized game states. For example, the codec 112 sends a game state generated by execution of the game program 117 via the network 110 and the router 152 to the NIC 174 of the computer 172 to inform the computer 172 of the game state. As another example, the NIC 174 of the computer 172 sends a game state generated by execution of the portion of game program 117 on the computer 172 via the router 152 and the network 110 to the codec 112 of the game cloud 102 to inform the one of more game cloud servers of the game state.

In some embodiments, media data, e.g., the media data 116, the additional media data, etc., that is generated by executing the game program 117 is sent from the codec 112 of the game cloud 102 via the network 110 to the HMD 104 for rendering of the media data to display a game on the display screen of the HMD 104 and media data that is generated by execution of a portion of the game program 117 by the processor 176 of the computer 172 is sent from the communications circuit 178 of the computer 172 to the HMD 104 for display of a game on the display screen. In these embodiments, the router 152 is bypassed when the media data is sent from the codec 112 to the HMD 104. In these embodiments, the game cloud 102 and the computer 172 have synchronized game states as described above.

In several embodiments, media data, e.g., the media data 116, the additional media data, etc., that is generated by executing the game program 117 and that is sent from the codec 112 of the game cloud 102 via the network 110 and the router 152 to the HMD 104 for rendering of the media data on the display screen of the HMD 104 has a higher amount of graphics than media data that is generated by execution of a portion of the game program 117 by the processor 176 of the computer 172.

In some embodiments, media data, e.g., the media data 116, the additional media data, etc., that is generated by executing the game program 117 and that is sent from the codec 112 of the game cloud 102 via the network 110 to the HMD 104 for rendering of the media data on the display screen of the HMD 104 has a higher amount of graphics than media data that is generated by execution of a portion of the game program 117 by the processor 176 of the computer 172. In these embodiments, the router 152 is bypassed when the media data is sent from the codec 112 of the game cloud 102 via the network 110 to the HMD 104.

In various embodiments, the HMD 104 (FIGS. 1A-1C) is used to display a two-dimensional or a three-dimensional image.

Figure 2:
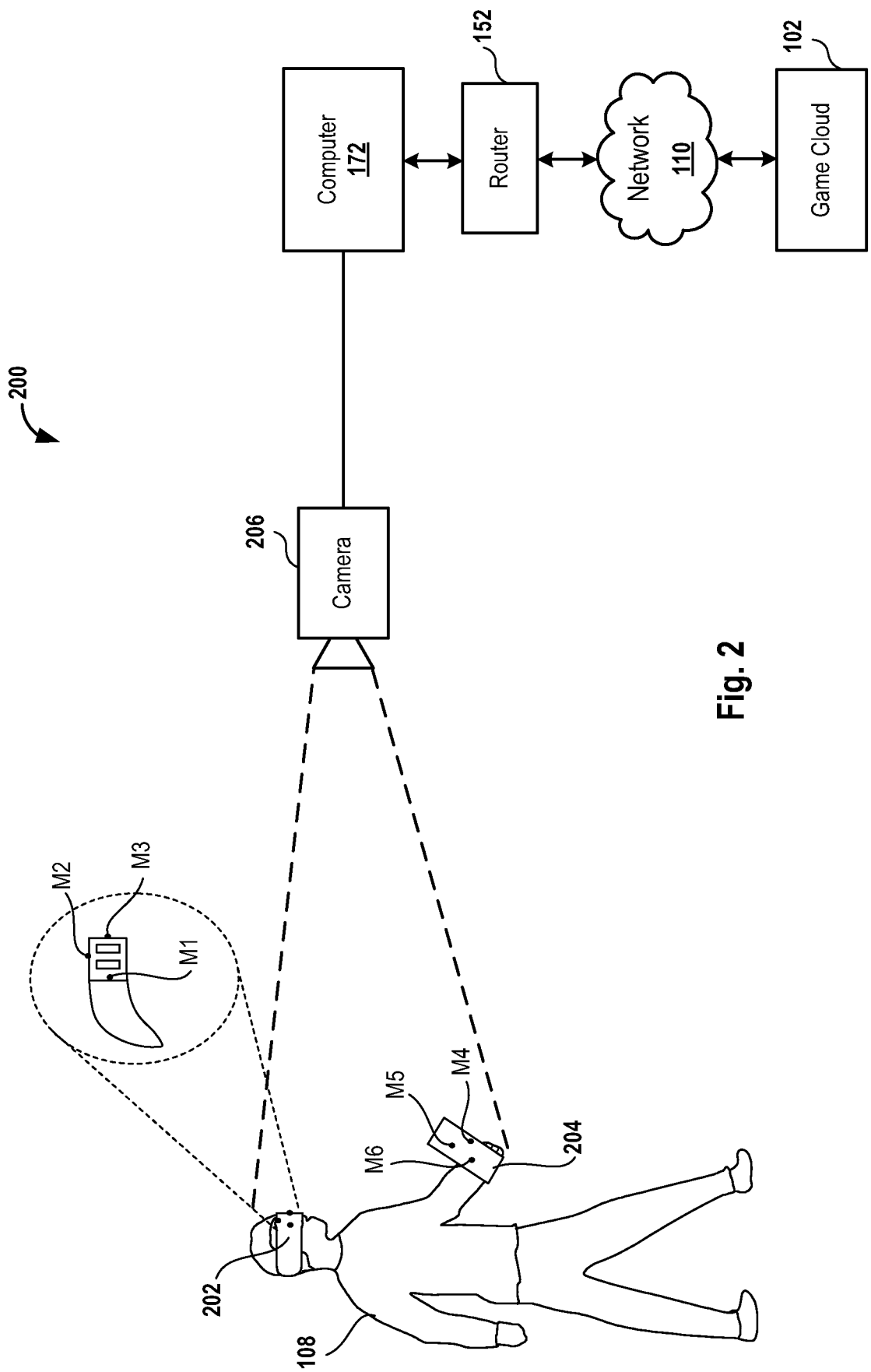
FIG. 2 is a diagram of a system for illustrating generation of input data based on head actions and/or hand actions of a user, in accordance with one embodiment described in the present disclosure.

FIG. 2 is a diagram of an embodiment of a system 200 for illustrating generation of input data based on the one or more head actions and/or the one or more hand actions. The user 108 is wearing an HMD 202 and is holding an HHC 204. The HMD 202 is an example of the HMD 104 (FIGS. 1A-1C) and the HHC 204 is an example of the HHC 106 (FIGS. 1A-1C).

The HMD 202 includes one or more markers, e.g., a marker M1, a marker M2, and a marker M3, etc. Similarly, the HHC 204 includes one or more markers, e.g., a marker M4, a marker M5, and a marker M6, etc. Each marker may be a light emitting diode, a light source, a color, a reflective material, etc.

A video camera 206 captures an image of the HMD 202. When the head of the user 108 tilts or moves, position and location of the markers M1 thru M3 changes in an xyz co-ordinate system. The video camera 206 captures an image of the markers M1 thru M3 and sends the image to the computer 172. An image of the markers M1 thru M3 is an example of input data. Position of the HMD 202 in a three dimensional space (X, Y, Z) can be determined by the processor 176 (FIG. 1C) of the computer 172 based on the positions of the markers M1 thru M3 in the image. Moreover, inertial motion, e.g., yaw, tilt, and roll, etc., of the HMD 202 is determined by the processor 176 (FIG. 1C) of the computer 172 based on movement of the markers M1 thru M3.

In various embodiments, the video camera 206 is mobile. For example, the video camera 206 is attached to a robotic device, e.g., a multicopter, a robotic arm, a robot, a robotic vehicle, a robotic car, a quadcopter, etc. For example, the video camera 206 is attached with respect to, e.g., under, on top of, to a side of, etc., the robotic device for capturing images of the HMD 202 and/or the HHC 204. The HMD 202 moves with movement of a head of the user 108. In several embodiments, instead of the video camera 206, a digital camera is used.

In some embodiments, the video camera 206 captures an image of the HHC 204. When the hand of the user 108 moves, position and location of the markers M4 thru M6 changes in the co-ordinate system. The video camera 206 captures an image of the markers M4 thru M6 and sends the image to the computer 172. An image of the markers M4 thru M6 is an example of input data. Position of the HHC 204 in a three dimensional space (X, Y, Z) can be determined by the processor 176 of the computer 172 based on the positions of the markers M4 thru M6 in the image. Moreover, inertial motion, e.g., yaw, tilt, and roll, etc., of the HHC 204 is determined by the processor 176 of the computer 172 based on movement of the markers M4 thru M6.

In some embodiments, instead of the HHC 204, a hand of the user 108 is marked with markers M4 thru M6.

Figure 3:
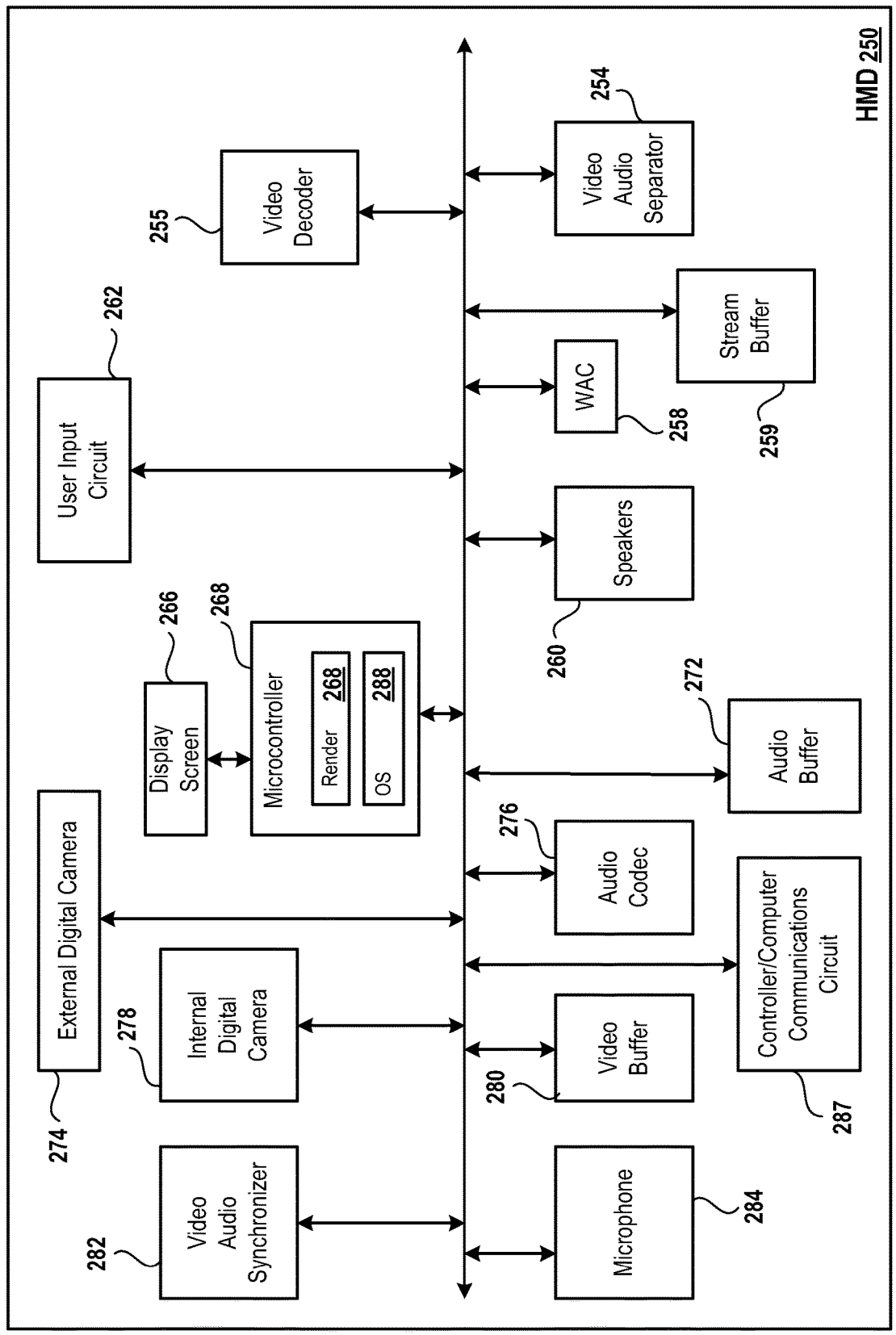
FIG. 3 is a diagram of an HMD, which is an example of the HMD of FIG. 1A, in accordance with one embodiment described in the present disclosure.

FIG. 3 is a diagram of an embodiment of an HMD 250, which is an example of the HMD 104 (FIGS. 1A-1C). The HMD 250 includes a video audio separator 254, a video decoder 255, a WAC 258, a stream buffer 259, one or more speakers 260, a user input circuit 262, a display screen 266, a microcontroller 268, an audio buffer 272, an external digital camera 274, an audio codec 276, an internal digital camera 278, a video buffer 280, a video audio synchronizer 282, a microphone 284, and a controller/computer communications circuit 287. The external digital camera 274 faces a real-world environment of the user 108 and the internal digital camera 278 faces the user 108, e.g., eyes, head, etc. of the user 108.

In a number of embodiments, the speakers 260 are an audio circuit. In various embodiments, the audio codec 276, the audio buffer 272, and/or the speakers 260 are an audio circuit. In some embodiments, a combination of the video decoder 255 and the microcontroller 268 is referred to herein as a game processing circuit. In various embodiments, the microcontroller 268 is a display circuit. Examples of a display screen include an LED screen, a liquid crystal display (LCD) screen, a liquid crystal on silicon screen, an organic LED (OLED) screen, a plasma screen, etc. An example of the external digital camera 274 includes a Playstation Eye® manufactured by Sony Computer Entertainment, Inc.

The microcontroller 268 stores a rendering program 286 and an operating system 288. The rendering program 286 and the operating system 288 are stored in a memory device of the microcontroller 286 and executed by a microprocessor of the microcontroller 268. An example of microcontroller 268 includes a low cost microcontroller that includes a driver, e.g., an LCD driver, that drives, e.g., generates a signal to provide to, generate a signal to activate, etc., elements, e.g., LCDs, of the display screen 266 to display a game on the display screen 266. Another example of the microcontroller 268 includes a graphical processing unit (GPU) and a memory device.

In some embodiments, the memory device of the microcontroller 268 is other than a flash memory or a random access memory (RAM). For example, the memory device of the microcontroller is a buffer. In various embodiments, memory device of the microcontroller 268 is a flash memory or a RAM. Examples of the user input circuit 262 include a gyroscope, a magnetometer, and an accelerometer. An example of the WAC 258 includes a NIC. In some embodiments, the WAC 258 is referred to herein as a communications circuit.

A stream of encoded media data is received into the stream buffer 259 from the network 110 or the router 152 (FIGS. 1B-1C, 2). Examples of the encoded media data that is received by the stream buffer 259 includes the media data 116 (FIGS. 1A-1C, 2) that is encoded and the additional media data that is encoded, etc. It should be noted that when the router 152 is coupled to the computer 172 (FIG. 2), media data received from the computer 172 is stored in a buffer (not shown) of the HMD 250 instead of being stored in the stream buffer 259.

The WAC 258 accesses the stream of encoded media data from the stream buffer 259 and depacketizes the stream. Moreover, the WAC 258 also includes a decoder to decode the encoded media data.

In embodiments in which the stream of encoded media data is received by the computer 172 (FIG. 1C) via the router 152 (FIG. 1C), the NIC 174 (FIG. 1C) of the computer 172 depacketizes and decodes the stream of encoded media data to generate decoded data, which is sent by the router 152 to the buffer (not shown) of the HMD 250 for storage.

The decoded data is accessed by the video audio separator 254 from the WAC 258 or from the buffer (not shown) of the HMD 250. The video audio separator 254 separates audio data within the decoded data from video data.

The video audio separator 254 sends the audio data to the audio buffer 272 and the video data to the video buffer 280. The video audio synchronizer 282 synchronizes the video data stored in the video buffer 280 with the audio data stored in the audio buffer 272. For example, the video audio synchronizer 282 uses a time of playback of the video data and the audio data to synchronize the video data with the audio data.

The audio codec 276 converts the synchronized audio data from a digital format into an analog format to generate audio signals and the audio signals are played back by the speakers 260 to generate sound. The video decoder 255 decodes, e.g., changes from a digital form to an analog form, etc., the synchronized video data to generate analog video signals. The microcontroller 268 executes the rendering program 286 to display a game on the display screen 266 based on the analog video signals that are generated by the video decoder 255. In some embodiments, the game displayed on the display screen 266 is displayed synchronous with the playback of the audio signals.

Moreover, the user 108 (FIGS. 1A-1C, 2) speaks into the microphone 284, which converts sound, e.g., voice, etc., signals to electrical signals, e.g., audio signals. The audio codec 276 converts the audio signals from an analog format to a digital format to generate audio data, which is stored in the audio buffer 276. The audio data stored in the audio buffer 276 is an example of input data generated based on a sound of the user 108. The audio data is accessed by the WAC 258 from the audio buffer 276 to send via the network 110 (FIGS. 1A-1C, 2) to the codec 112 (FIGS. 1A-1C) of the game cloud 102 (FIGS. 1A-1C, 2). For example, the WAC 258 packetizes and encodes the audio data accessed from the audio buffer 276 to send via the network 110 to the codec 112.

In some embodiments, the audio data is accessed by the WAC 258 from the audio buffer 276 to send via the router 152 (FIGS. 1B-1C, 2) and the network 110 (FIGS. 1A-1C, 2) to the codec 112 (FIGS. 1A-1C) of the game cloud 102. For example, the WAC 258 packetizes and encodes the audio data accessed from the audio buffer 276 to send via the router 152 and the network 110 to the codec 112.

The internal digital camera 278 captures one or more images of the one or more head actions of the user 108 (FIGS. 1A-1C, 2) to generate image data, which is an example of input data that is generated based on the one or more head actions. Similarly, the external digital camera 278 captures one or more images of the hand of the user 108, and/or of markers located on the hand of the user 108 to generate image data. The image data generated based on the markers located on the hand of the user 108 or based on the movement of the hand of the user 108 is an example of input data that is generated based on the one or more hand actions. The image data captured by the digital cameras 274 and 278 is stored in the video buffer 280.

In some embodiments, the image data captured by the digital cameras 274 and 278 is stored in a buffer of the HMD 250 and the buffer is other than the video buffer 280. In various embodiments, the image data captured by the digital cameras 274 and 278 is decoded by the video decoder 255 and sent to the microcontroller 268 for display of images on the display screen 266.

The image data captured by the digital cameras 274 and 278 is accessed by the WAC 258 from the video buffer 280 to send via the network 110 (FIGS. 1A-1C, 2) to the codec 112 (FIGS. 1A-1C) of the game cloud 102 (FIGS. 1A-1C, 2). For example, the WAC 258 packetizes and encodes the image data accessed from the video buffer 280 to send via the network 110 to the codec 112.

In some embodiments, the video data is accessed by the WAC 258 from the video buffer 280 to send via the router 152 (FIGS. 1B-1C, 2) and the network 110 (FIGS. 1A-1C, 2) to the codec 112 (FIGS. 1A-1C) of the game cloud 102. For example, the WAC 258 packetizes and encodes the video data accessed from the video buffer 280 to send via the router 152 and the network 110 to the codec 112.

The controller/computer communications circuit 287 receives media data from the computer 172 for storage in the buffer (not shown) of the HMD 250. Moreover, the controller/computer communications circuit 287 receives input signals from the HHC 106 (FIGS. 1A-1C, 2), converts the input signals from an analog form to a digital form to generate input data, which is accessed by the WAC 258 to send via the network 110 (FIGS. 1A-1C, 2) to the codec 112 (FIGS. 1A-1C) of the game cloud 102 (FIGS. 1A-1C, 2). For example, the WAC 258 packetizes and encodes the input data accessed from the controller/computer communications circuit 287 to send via the network 110 to the codec 112.

In some embodiments, the input data is accessed by the WAC 258 from the controller/computer communications circuit 287 to send via the router 152 (FIGS. 1B-1C, 2) and the network 110 (FIGS. 1A-1C, 2) to the codec 112 (FIGS. 1A-1C) of the game cloud 102. For example, the WAC 258 packetizes and encodes the input data accessed from the controller/computer communications circuit 287 to send via the router 152 and the network 110 to the codec 112.

It should be noted that instead of the controller/computer communications circuit 287, two separate communications circuits may be used, one for communicating, e.g., receiving, sending, etc., data with the computer 172 (FIG. 1B) and another for communicating data with the HHC 106 (FIGS. 1A-1C, 2).

In a number of embodiments, the decoder of the WAC 258 is located outside the WAC 258. In various embodiments, the stream buffer 259 is located within the WAC 258.

In some embodiments, the HMD 250 excludes the external digital camera 274. In several embodiments, the HMD 250 includes any number of microcontrollers, any number of buffers, and/or any number of memory devices.

In various embodiments, the HMD 250 includes one or more batteries that provide power to components, e.g., the video audio separator 254, the WAC 258, the stream buffer 259, the one or more speakers 260, the user input circuit 262, the display screen 266 the microcontroller 268, the audio buffer 272, the external digital camera 274, the audio codec 276, the internal digital camera 278, the video buffer 280, the video audio synchronizer 282, the microphone 284, and the controller/computer communications circuit 287. The one or more batteries are charged with a charger (not shown) that can be plugged into an alternating current outlet.

In a number of embodiments, input data and/or media data is referred to herein as interactive media.

In some embodiments, the HMD 250 includes a communications circuit (not shown) to facilitate peer-to-peer multichannel communication between local users via pairing. For example, the HMD 250 includes a transceiver that modulates sound signals received from the microphone 284 and sends the modulated signals via a channel to a transceiver of another HMD (not shown). The transceiver of the other HMD demodulates the signals to provide to speakers of the other HMD to facilitate communication between the users.

In various embodiments, different channels are used by the transceiver of the HMD 250 to communicate with different other HMDs. For example, a channel over which the modulated signals are sent to a first other HMD is different than a channel over which modulated signals are sent to a second other HMD.

In some embodiments, the WAC 258, the user input circuit 262, the microcontroller 268 and the video decoder 255 are integrated in one or more individual circuit chips. For example, the WAC 258, the video decoder 255 and the microcontroller 268 are integrated in one circuit chip and the user input circuit 262 is integrated into another circuit chip. As another example, each of the WAC 258, the user input circuit 262, the microcontroller 268 and the video decoder 255 is integrated in a separate circuit chip.

In some embodiments, a video camera is used instead of a digital camera. For example, a video camera is used instead of the external digital camera 274 (FIG. 3) and another video camera is used instead of the internal digital camera 278 (FIG. 3).

In several embodiments, the HMD 250 lacks the external digital camera 274 and/or lacks the internal digital camera 278. In these embodiments, position and motion of the HMD 250 is determined by the one or more servers of the game cloud 102 and/or by the processor 176 (FIG. 1C) of the computer 172 (FIG. 1C) based on input data that is generated by the user input circuit 262 and sent via the network 110 (FIGS. 1A-1C, 2) or sent via the router 152 (FIGS.

1B-1C, 2) and the network 110 or sent via the router 152, the computer 172, and the network 110.

In some embodiments, when the internal digital camera 278 is unable to view the eyes or head of the user 108 and/or when the video camera 206 (FIG. 2) is unable to view the head of the user 108, the user input circuit 262 generates input data. In these embodiments, position and motion of the HMD 250 is determined by the one or more servers of the game cloud 102 and/or by the processor 176 (FIG. 1C) of the computer 172 (FIG. 1C) based on the input data that is sent to the game cloud 102 via the network 110 (FIGS. 1A-1C, 2) or sent via the router 152 (FIGS. 1B-1C, 2) and the network 110 or sent via the router 152, the computer 172, and the network 110.

In some embodiments, the HMD 250, e.g., the WAC 258 of the HMD 250, etc., switches between two or more modes. A first mode includes use of the router 152 (FIGS. 1B-1C, 2) and the computer 172 (FIGS. 1C & 2) in communicating data between the HMD 250 and the game cloud 102 (FIGS. 1A-1C, 2) via the network 110 (FIGS. 1A-1C, 2). A second mode includes use of the router 152 in communicating data between the HMD 250 and the game cloud 102 via the network 110. In the second mode, the computer 172 is bypassed when data is communicated. A third mode includes use of the network 110 in communicating data between the HMD 250 and the game cloud 102 via the network 110. In the third mode, the router 152 and the computer 172 are bypassed when data is communicated.

In some embodiments, the user 108 uses the HMD 104 with the HHC 106 and position and motion of the HMD 104 and position and motion of the HHC 106 is represented in a single virtual game scene. For example, the HHC 106 is represented as a sword within a game, e.g., an immersive environment game, etc., that is generated by execution of the game program 117 and that is displayed in the HMD 104. In this example, the game has a virtual game scene. When the user 108 turns his/her head to the left, the user 108 is shown a left portion of the game scene and when the user 108 turn his/her head right, the user 108 is shown a right portion of the game scene. The display of the portion of the game scene is based on position and movement of the HMD 104. Moreover, when the user 108 moves the HHC 106 to the left and moves the HMD 104 to the left, the user is shown the sword pointing to the left in the left portion of the game scene. When the user 108 moves the HHC 106 to the left and moves the HMD 104 to the right, the user is shown the right portion of the game scene and the sword is not displayed in the right portion. Furthermore, when the user 108 moves the HHC 106 to the right and moves the HMD 104 to the right, the user is shown the sword pointing to the right in the right portion of the game scene. When the user 108 moves the HHC 106 to the right and moves the HMD 104 to the left, the user 108 is shown the right portion of the game scene and the sword is not displayed in the right portion of the game scene. The display or lack thereof of the sword in a portion of the game scene is based on position and motion of the HHC 106.

Figure 4A:
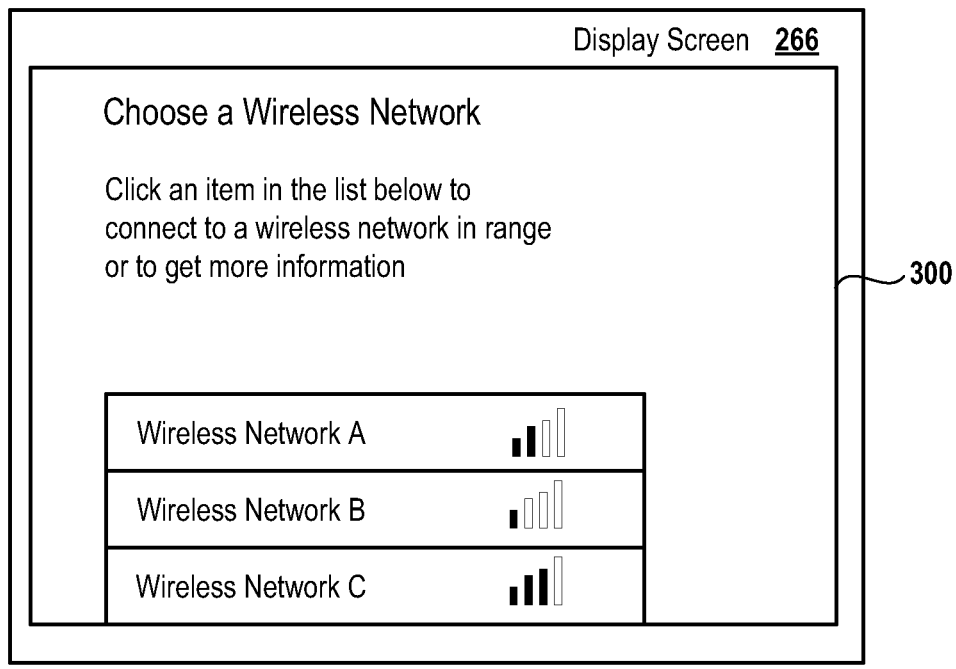
FIG. 4A is a diagram of an image that is displayed on a display screen of the HMD of FIG. 3 to access a wireless network, in accordance with one embodiment described in the present disclosure.

FIG. 4A is a diagram of an embodiment of an image 300 that is displayed on the display screen 266 of the HMD 250 (FIG. 3) to access a wireless network. The image 300 is generated by the microcontroller 268 (FIG. 3) when the network access application is executed by the microcontroller 268 (FIG. 3). The image 300 includes the list of networks, e.g., a wireless network A, a wireless network B, a wireless network C, etc., that the HMD 250 can connect to for access of the game program 117 from the game cloud 102. The user 108 selects by performing the one or more head actions and/or the one or more hand actions one of the wireless networks A, B, and C to connect the HMD 250 to the wireless network.

In a number of embodiments, the image 300 includes any number of wireless networks listed.

Figure 4B:
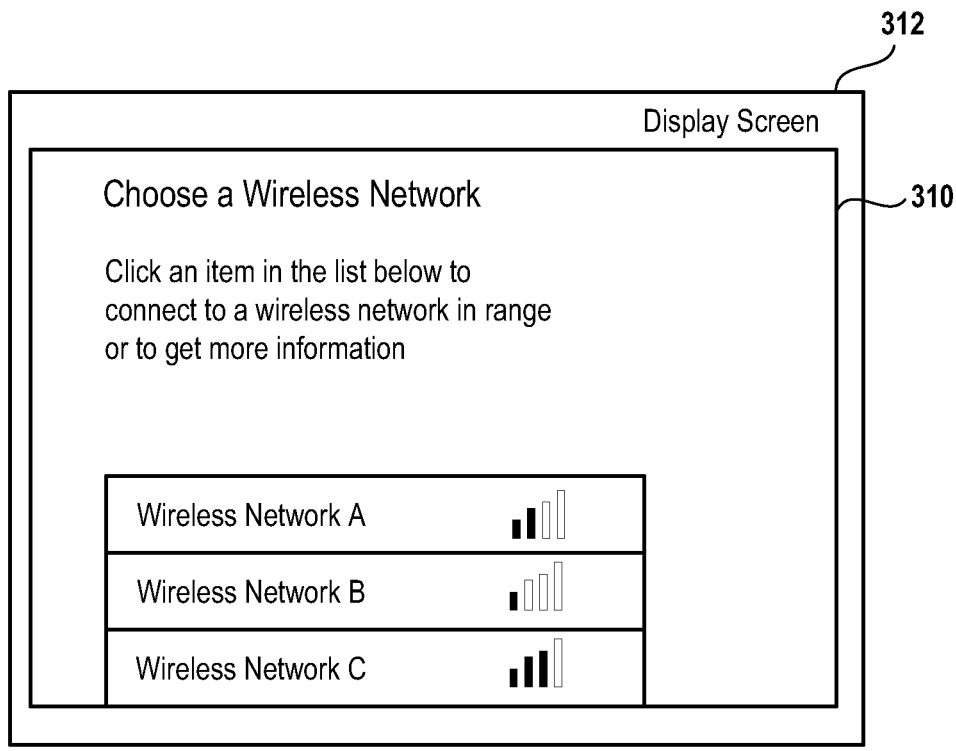
FIG. 4B is a diagram of an image that is displayed on a display screen of a computer to access a wireless network, in accordance with one embodiment described in the present disclosure.

FIG. 4B is a diagram of an embodiment of an image 310 that is displayed on a display screen 312 of the computer 172 (FIG. 2) to access a wireless network. The image 310 is generated by a GPU of the computer 172 when the network access application is executed by the processor 176 (FIG. 2) of the computer 172. The image 310 includes the list of networks, e.g., the wireless network A, the wireless network B, the wireless network C, etc., that the HMD 250 can connect to via the router 152 and the computer 172 for access of the game program 117 from the game cloud 102. The user 108 selects by performing the one or more head actions and/or the one or more hand actions one of the wireless networks A, B, and C to connect the HMD 250 to the wireless network via the router 152 and the computer 172.

In a number of embodiments, the image 310 includes any number of wireless networks listed.

Figure 5A:
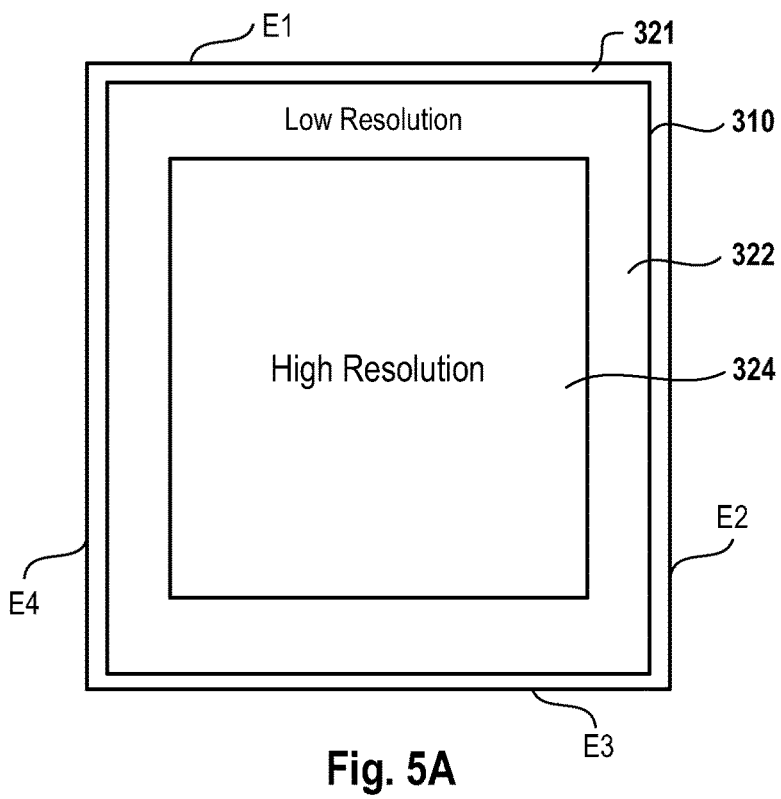
FIG. 5A is a diagram of an image of a game that is displayed on the display screen of the HMD of FIG. 3, where a peripheral area of the display screen of the HMD has a low resolution and a central area has a high resolution, in accordance with one embodiment described in the present disclosure.

FIG. 5A is a diagram of an embodiment of an image 320 of a game that is displayed on a display screen 321, which is an example of the display screen 266 (FIG. 3). A peripheral area 322 of the image 320 is displayed at a low resolution by the microcontroller 268 (FIG. 3) and a central area 324 is displayed at a high resolution by the microcontroller 268. The high resolution is higher than the lower resolution. The peripheral area 322 is adjacent to edges E1 thru E4 of the display screen 321.

In some embodiments, the edge E1 is perpendicular to the edge E2 and to the edge E4. The edge E3 is perpendicular to the edges E2 and E4 and is parallel to the edge E1. In various embodiments, the edge E1 is substantially perpendicular, e.g., at an angle ranging from 87 degrees to 93 degrees, etc., to the edge E2 and to the edge E4. The edge E3 is substantially perpendicular to the edges E2 and E4 and is substantially parallel to the edge E1.

It should be noted that in some embodiments, the display screen 321 is of any shape, e.g., rectangular, square, circular, oval, polygonal, curved, etc.

Based on an image of a gaze captured by the internal digital camera 278 (FIG. 3), the microcontroller 268 (FIG. 3) splits the display screen 321 into the areas 322 and 324. For example, upon determining that the user 108 (FIGS. 1A-1C, 2) is gazing at the central area 324, the microcontroller 268 determines that the central area 324 have the high resolution, determines that the peripheral area 322 have the low resolution, and executes the rendering program 286 to display the central area 324 with the high resolution and to display the peripheral area 322 with the low resolution.

Figure 5B:
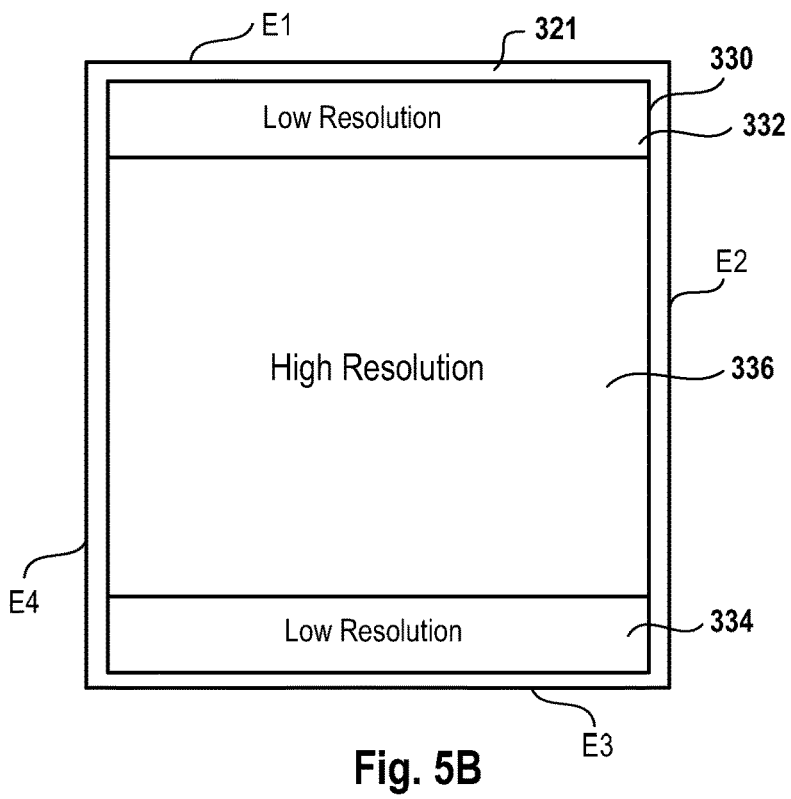
FIG. 5B is a diagram of an image of a game that is displayed on the display screen of the HMD of FIG. 3, where a top area and a bottom area of the display screen of the HMD has a low resolution and an area between the top and bottom areas has a high resolution, in accordance with one embodiment described in the present disclosure.

FIG. 5B is a diagram of an embodiment of an image 330 that is displayed on the display screen 321. The image 330 has a top peripheral area 332 and a bottom peripheral area 334. The top peripheral area 332 is adjacent to the edge E1 and the bottom peripheral area 334 is adjacent to the edge E3. The peripheral areas 332 and 334 have the low resolution and an in-between area 336 has the high resolution. The in-between area 336 is located adjacent to the edges E2 and E4 and is located between the areas 332 and 334.

Based on an image of a gaze captured by the internal digital camera 278 (FIG. 3), the microcontroller 268 (FIG. 3) splits the display screen 321 into the areas 332, 334, and 336. For example, upon determining that the user 108 (FIGS. 1A-1C, 2) is gazing at the in-between area 336, the microcontroller 268 determines that the in-between area 336 has the high resolution, determines that the peripheral areas 332 and 334 have the low resolution, and executes the rendering program 286 to display the in-between area 336 with the high resolution and to display the peripheral areas 332 and 334 with the low resolution.

In some embodiments, the peripheral area 332 has a different resolution than a resolution of the peripheral area 334. For example, the peripheral area 332 has a medium resolution, which is between the low and high resolutions, and the peripheral area 334 has the low resolution. As another example, the peripheral area 334 has the medium resolution and the peripheral area 332 has the low resolution.

Figure 5C:
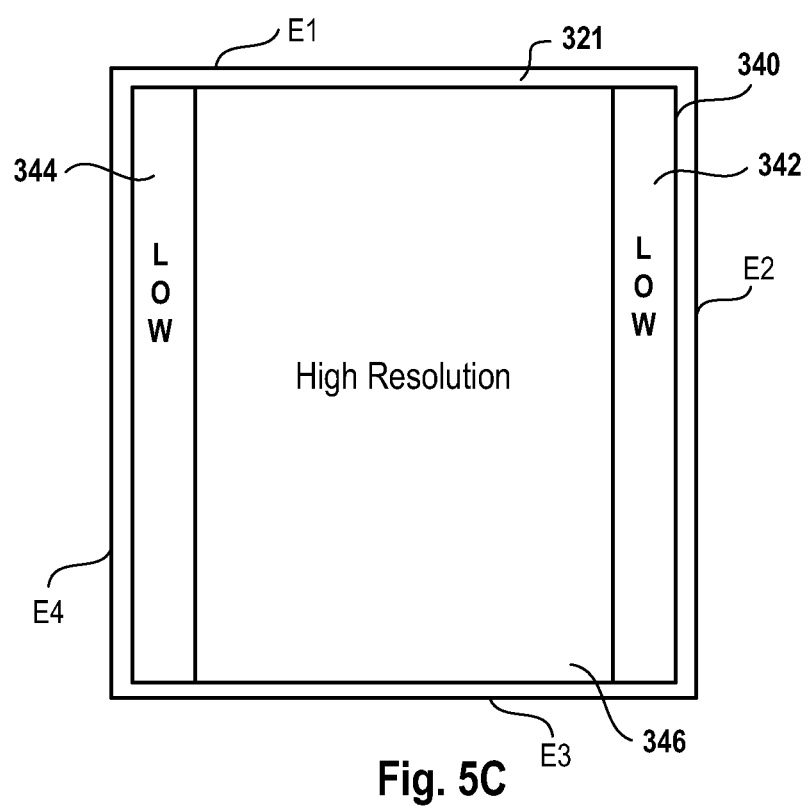
FIG. 5C is a diagram of an image of a game that is displayed on the display screen of the HMD of FIG. 3, where a right-side area and a left-side area of the display screen of the HMD has a low resolution and an area between the right-side and left-side areas has a high resolution, in accordance with one embodiment described in the present disclosure.

FIG. 5C is a diagram of an embodiment of an image 340 that is displayed on the display screen 321. The image 340 has a right peripheral area 342 and a left peripheral area 344. The right peripheral area 342 is adjacent to the edge E2 and the left peripheral area 344 is adjacent to the edge E4. The peripheral areas 342 and 344 have the low resolution and an in-between area 346 has the high resolution. The in-between area 346 is located adjacent to the edges E1 and E3 and is located between the areas 342 and 344.

Based on an image of a gaze captured by the internal digital camera 278 (FIG. 3), the microcontroller 268 (FIG. 3) splits the display screen 321 into the areas 342, 344, and 346. For example, upon determining that the user 108 (FIGS. 1A-1C, 2) is gazing at the in-between area 346, the microcontroller 268 determines that the in-between area 346 has the high resolution, determines that the peripheral areas 342 and 344 have the low resolution, and executes the rendering program 286 to display the in-between area 346 with the high resolution and to display the peripheral areas 342 and 344 with the low resolution.

In some embodiments, the peripheral area 342 has a different resolution than a resolution of the peripheral area 344. For example, the peripheral area 342 has a medium resolution, which is between the low and high resolutions, and the peripheral area 344 has the low resolution. As another example, the peripheral area 344 has the medium resolution and the peripheral area 342 has the low resolution.

In various embodiments, instead of the gaze, any other head action is used to determine one or more areas of the display screen 321 to have the high resolution and to determine one or more areas of the display screen 321 to have the low resolution or the low and medium resolutions.

In some embodiments, a peripheral area of a display screen is of any shape, e.g., curved, semi-circular, polygonal, etc. and a central or an in-between area of the display screen is of any shape, e.g., rectangular, circular, polygonal, elliptical, curved, etc.

Figure 6:
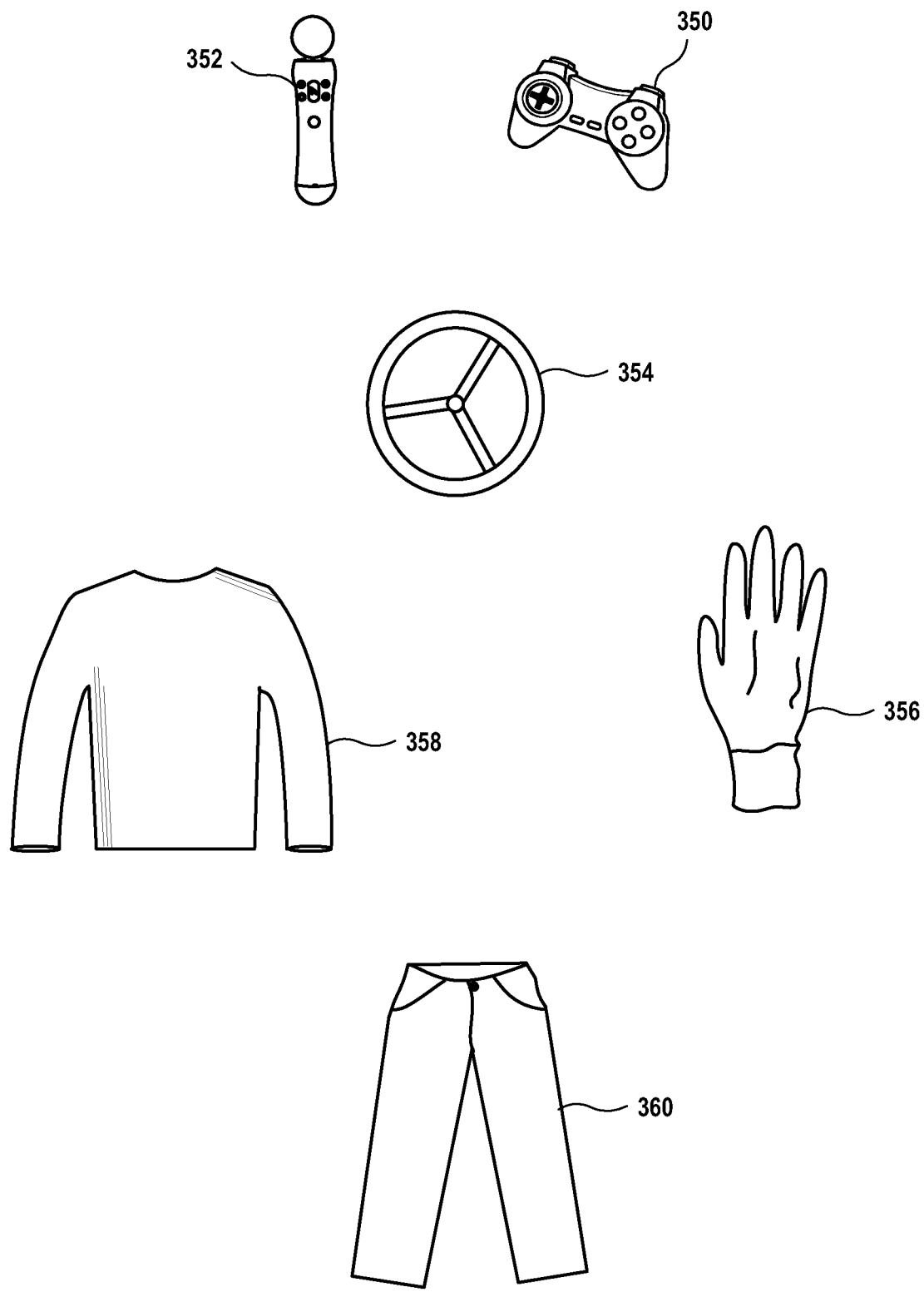
FIG. 6 is a diagram of illustrating various types of HHCs, in accordance with one embodiment described in the present disclosure.

FIG. 6 is a diagram of illustrating various types of HHCs 350, 352, 354, 356, 358, and 360. Each HHC 350, 352, 354, 356, 358, and 360 is an example of the HHC 106 (FIGS. 1A-1C, 2). As shown, the HHC 350 has a shape of a boomerang, the HHC 352 has a shape of a microphone, and the HHC 354 has a shape of a steering wheel. Moreover, the HHC 356 is a glove that is worn by the user 108 on his/her hands, the HHC 358 is a jacket, an upper body suit, or a shirt, etc., worn by the user 108 on his/her upper body, and the HHC 360 are pants worn by the user 108 on his/her lower body.

Each HHC 350, 352, 354, 356, 358, and 360 includes one or more feedback mechanisms, e.g., sensors, mechanical compressors, mechanical weight enhancers, mechanical weight reducers, mechanical decompressors, vibration mechanisms, tactile feedback mechanisms, heaters, coolers, electrical shockers, etc., for providing feedback to the user 108 during play of a game displayed by executing the game program 117 (FIGS. 1A-1C, 2).

In various embodiments, the user 108 wears the HHC 356 in addition to wearing the HMD 104 on his/her hands and pets a virtual dog during play of a game displayed by executing the game program 117. The tactile feedback mechanisms provide tactile feedback to the user 108 to enable the user 108 to feel as if the user 108 is petting a real dog. When the user 108 lifts the virtual dog, the weight enhancers function to enable the user 108 to feel as if the user 108 is lifting a real dog.

In some embodiments, the user 108 wears the HHC 358 in addition to wearing the HMD 104 and goes virtual scuba diving in a virtual ocean. The mechanical weight enhancers increase weight applied to the user 108 to enable the user 108 to feel as if the user 108 is scuba diving in the real ocean and feels weight of water above the user 108. Similarly, as the user 108 approaches a surface of the ocean, the mechanical weight reducers reduce weight applied on the user 108.

In some embodiments, each HHC 350, 352, 354, 356, 358, and 360 includes one or more fixed reference objects, examples of which are provided above, to determine position and motion of the HHC.

In various embodiments, the HHC 106 has any shape, e.g. rectangular, circular, oval, polygonal, curved, spiral, etc.

Figure 7A:
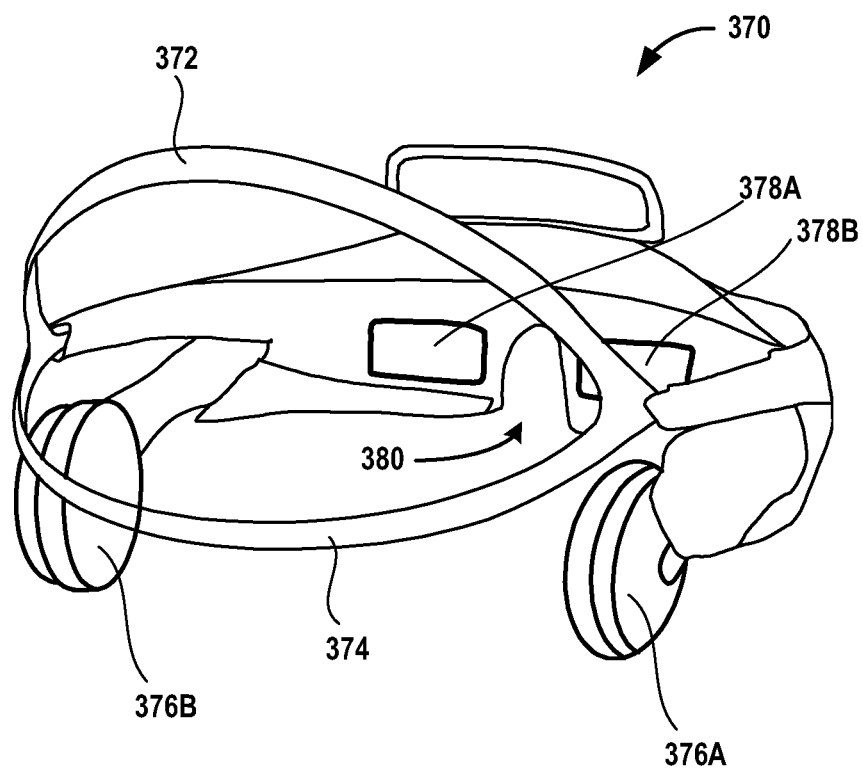
FIG. 7A is a diagram of an embodiment of an HMD, which is an example of the HMD of FIG. 3, in accordance with one embodiment described in the present disclosure.

FIG. 7A is a diagram of an embodiment of an HMD 370. The HMD 370 is an example of the HMD 250 (FIG. 3). The HMD 370 includes bands 372 and 374 that go to the back of the head of the user 108 (FIGS. 1A-1C, 2) when worn by the user 108. Moreover, the HMD 370 includes earphones 376A and 376B, e.g., speakers, etc., that emanate sound associated with a game that is played by execution of the game program 117 (FIGS. 1A-1C). The HMD 370 includes lenses 378A and 378B that allows the user 108 to view a game that is played by execution of the game program 117 (FIGS. 1A-1C) and that is displayed on the display screen 266 (FIG. 3). A groove 380 rests on a nose of the user 108 to support the HMD 370 on the nose.

In some embodiments, the HMD 370 is worn by the user 108 in a manner similar to which sunglasses, glasses, or reading glasses are worn by the user 108.

Figure 7B:
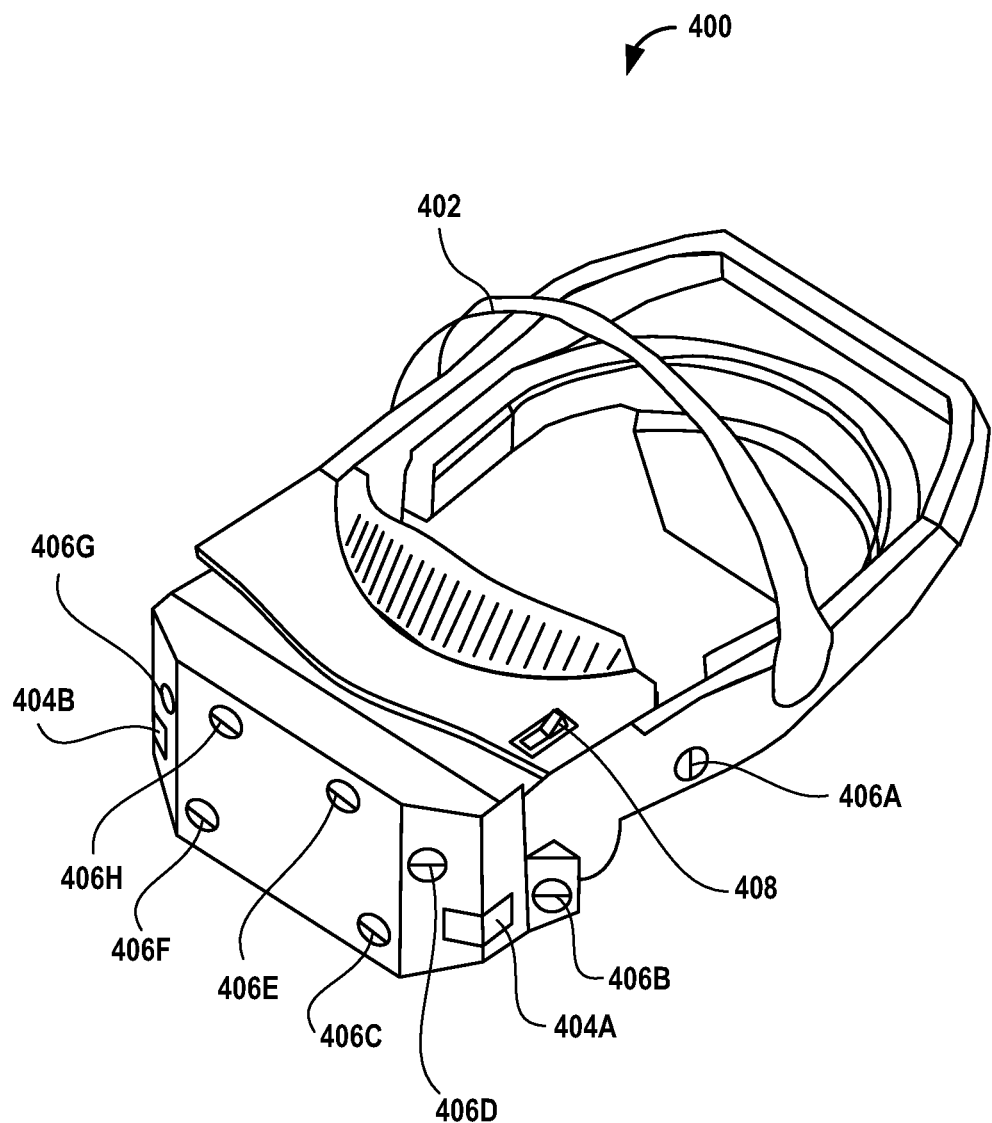
FIG. 7B is an isometric view of an embodiment of an HMD, which is an example of the HMD of FIG. 3, in accordance with one embodiment described in the present disclosure.

FIG. 7B is an isometric view of an embodiment of an HMD 400, which is an example of the HMD 250 (FIG. 3). In some embodiments, the HMD 400 is a product of research and development by Sony Computer Entertainment America LLC. The HMD 400 includes a head support 402. The HMD 400 further includes markers, e.g., LEDs 404A and 404B, infrared lights emitters 406A, 406B, 406C, 406D, 406E, 406F, 406G, and 406H. Examples of an infrared light emitter include an LED. The HMD 400 includes an on/off switch 408 that allows the HMD 400 to be powered on or powered off.

The markers are used to determine position and motion of the HMD 400. For example, with a movement of the head of the user 108 (FIGS. 1A-1C, 2), a size of an image captured by the external digital camera 274 (FIG. 3) changes. Based on the size, the processor of the computer 172 (FIG. 3) or the one or more servers of the game cloud 102 (FIGS. 1A-1C, 2) determine position and motion of the HMD 400 in the co-ordinate system.

Figure 8:
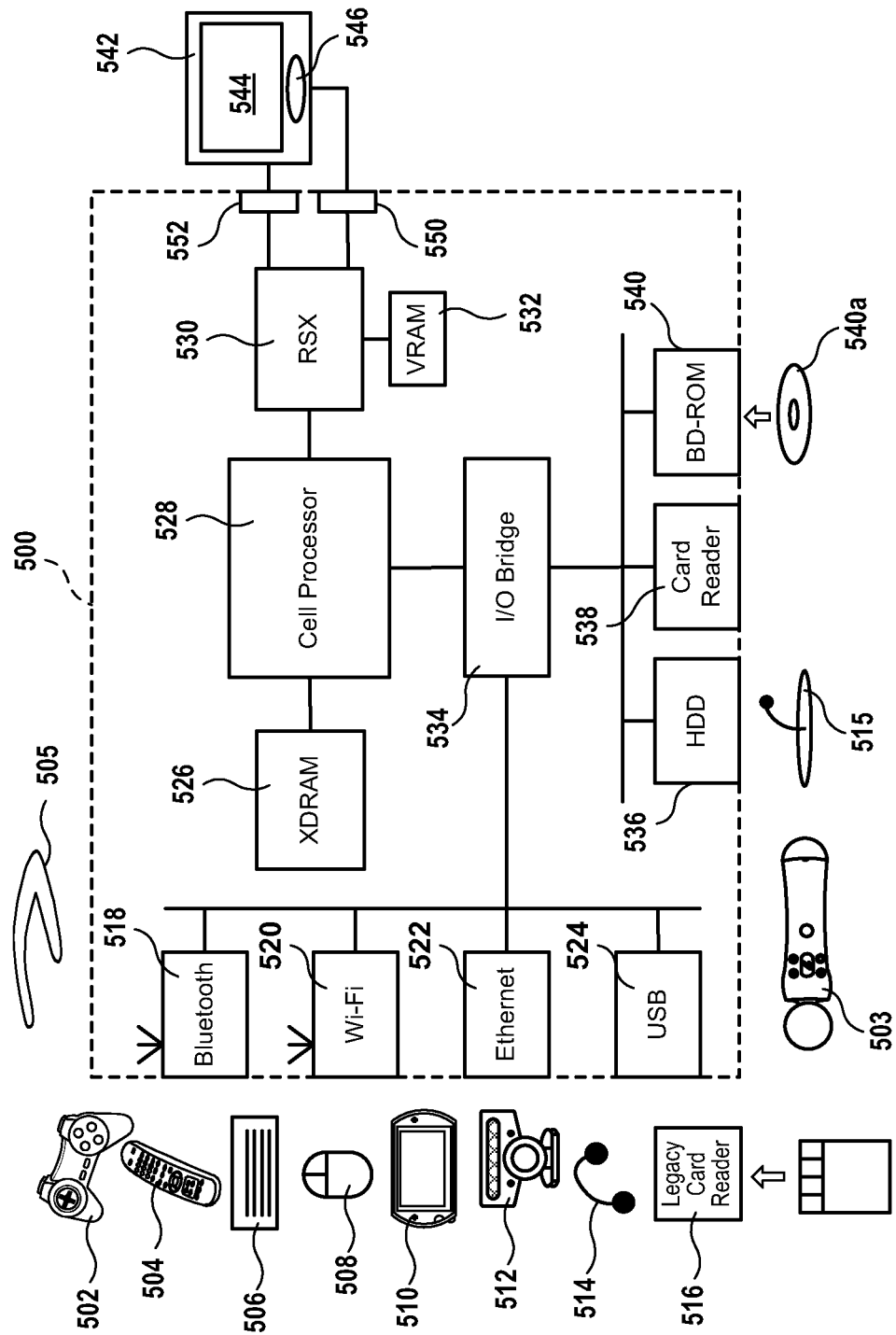
FIG. 8 is a block diagram of a console that is compatible for interfacing with an HHC and the HMD of FIG. 3, in accordance with one embodiment described in the present disclosure.

FIG. 8 is a block diagram of an embodiment of a console 500 that is compatible for interfacing with the HHC 106 and the HMD 104 (FIGS. 1A-1C, 2). The console 500 may be used to execute and render a portion of the game program 117. The console 500 is compatible for interfacing the HHC 106 and the HMD 104 (FIGS. 1A-1C, 2) with the game program 117. The console 500 is provided, with various peripheral devices connectable to the console 500. The console 500 has a cell processor 528, a Rambus® dynamic random access memory (XDRAM) unit 526, a Reality Synthesizer graphics processor unit 530 with a dedicated video random access memory (VRAM) unit 532, and an input/output (I/O) bridge 534. The console 500 also has a Blu Ray® Disk read-only memory (BD-ROM) optical disk reader 540 for reading from a disk 540*a* and a removable slot-in hard disk drive (HDD) 536, accessible through the I/O bridge 534. Optionally, the console 500 also includes a memory card reader 538 for reading compact flash memory cards, Memory Stick® memory cards and the like, which is similarly accessible through the I/O bridge 534.

The I/O bridge 534 also connects to Universal Serial Bus (USB) 2.0 ports 524, a gigabit Ethernet port 522, an IEEE 802.11b/g wireless network (Wi-Fi) port 520, and a Bluetooth® wireless link port 518 capable of supporting Bluetooth connections.

In operation, the I/O bridge 534 handles all wireless, universal serial bus (USB) and Ethernet data, including data from one or more game controllers 502 and 503 and from an HMD 505, which is an example of the HMD 250 (FIG. 3). For example, when the user 108 (FIGS. 1A-1C, 2) is playing a game generated by execution of a portion of the game program 117 (FIG. 1A), the I/O bridge 534 receives input data from the game controller 502 or 503 or from the HMD 505 via a Bluetooth link and directs the input data to the cell processor 528, which updates a current state of the game accordingly. Each game controller 502 and 503 is an example of the HHC 106 (FIGS. 1A-1C, 2).

The wireless, USB and Ethernet ports also provide connectivity for other peripheral devices in addition to game controllers 502 and 503 and the HMD 505, such as, for example, a remote control 504, a keyboard 506, a mouse 508, a portable entertainment device 510 such as a Sony Playstation Portable® entertainment device, a video camera such as an EyeToy® video camera 512, a microphone headset 514, and a microphone 515. Such peripheral devices may therefore in principle be connected to the console 500 wirelessly, for example, the portable entertainment device 510 may communicate via a Wi-Fi ad-hoc connection, whilst the microphone headset 514 may communicate via a Bluetooth link.

The provision of these interfaces means that the console 500 is also potentially compatible with other peripheral devices such as digital video recorders (DVRs), set-top boxes, digital cameras, portable media players, Voice over IP telephones, mobile telephones, printers and scanners.

In addition, a legacy memory card reader 516 may be connected to the console 500 via a USB port 524, enabling the reading of memory cards 548 of the kind used by the console 500.

The game controllers 502 and 503 and the HMD 505 are operable to communicate wirelessly with the console 500 via the Bluetooth link, or to be connected to a USB port, thereby also providing power by which to charge batteries of the game controller 502 and 503 and the HMD 505. In some embodiments, each of the game controllers 502 and 503 and the HMD 505 may also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols, such as, for example, Bluetooth, Wi-Fi, etc.

The game controller 502 is a controller designed to be used with two hands of the user 108, and game controller 503 is a single-hand controller with an attachment. The HMD 505 is designed to fit on top of a head and/or in front of eyes of the user 108. In addition to one or more analog joysticks and conventional control buttons, each game controller 502 and 503 is susceptible to three-dimensional location determination. Similarly, the HMD 505 is susceptible to three-dimensional location determination. Consequently gestures and movements by the user 108 of the game controller 502 and 503 and of the HMD 505 may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on a display screen of the device. Other alternative or supplementary control devices may also be used, such as a dance mat (not shown), a light gun (not shown), and a steering wheel and pedals (not shown) or bespoke controllers, such as a single or several large buttons for a rapid-response quiz game (also not shown).

The remote control 504 is also operable to communicate wirelessly with the console 500 via a Bluetooth link. The remote control 504 comprises controls suitable for the operation of the Blu Ray™ Disk BD-ROM reader 540 and for the navigation of disk content.

The Blu Ray™ Disk BD-ROM reader 540 is operable to read CD-ROMs compatible with the console 500, in addition to conventional pre-recorded and recordable CDs, and so-called Super Audio CDs. The reader 540 is also operable to read digital video disk-ROMs (DVD-ROMs) compatible with the console 500, in addition to conventional pre-recorded and recordable DVDs. The reader 540 is further operable to read BD-ROMs compatible with the console 500, as well as conventional pre-recorded and recordable Blu-Ray Disks.

The console 500 is operable to supply audio and video, either generated or decoded via the Reality Synthesizer graphics unit 530, through audio connectors 550 and video connectors 552 to a display and sound output device 542 such as a monitor or television set having a display screen 544 and one or more loudspeakers 546. The audio connectors 550 may include conventional analogue and digital outputs whilst the video connectors 552 may variously include component video, S-video, composite video and one or more High Definition Multimedia Interface (HDMI) outputs. Consequently, video output may be in formats such as PAL or NTSC, or in 520p, 1080i or 1080p high definition.

Audio processing (generation, decoding and so on) is performed by the cell processor 528. An operating system of the console 500 supports Dolby® 5.1 surround sound, Dolby® Theatre Surround (DTS), and the decoding of 7.1 surround sound from Blu-Ray® disks.

In some embodiments, a video camera, e.g., the video camera 512, etc., comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the console 500. An LED indicator of the video camera 512 is arranged to illuminate in response to appropriate control data from the console 500, for example to signify adverse lighting conditions. Embodiments of the video camera 512 may variously connect to the console 500 via a USB, Bluetooth or Wi-Fi communication port. Embodiments of a video camera may include one or more associated microphones and also be capable of transmitting audio data. In embodiments of a video camera, the CCD may have a resolution suitable for high-definition video capture. In use, images captured by the video camera may for example be incorporated within a game or interpreted as game control inputs. In another embodiment, a video camera is an infrared camera suitable for detecting infrared light.

In various embodiments, in order for successful data communication to occur with a peripheral device, such as, for example, a video camera or remote control via one of the communication ports of the console 500, an appropriate piece of software such as a device driver is provided.

In some embodiments, the aforementioned system devices, including a console device, a portable HHC, and a portable HMD enable the HHC and the portable HMD to display and capture video of an interactive session of the game program 117 (FIGS. 1A-1C). The console device initiates an interactive session of the game program 117, the interactive session defining interactivity between the user 108 and the game program 117. The system devices determine an initial position and orientation of the HHC and/or the HMD operated by the user 108 (FIGS. 1A-1C, 2). The console device determines a current state of the game program 117 based on the interactivity between the user 108 and the game program 117. The system devices track the position and orientation of the HHC and or the HMD during an interactive session of the user 108 with the game program 117. The system devices generate a spectator video stream of the interactive session based on a current state of the game program 117 and the tracked position and orientation of the HHC and/or the HMD. In some embodiments, the HHC renders the spectator video stream on a display screen of the HHC. In various embodiments, the HMD renders the spectator video stream on a display screen of the HMD.

Figure 9:
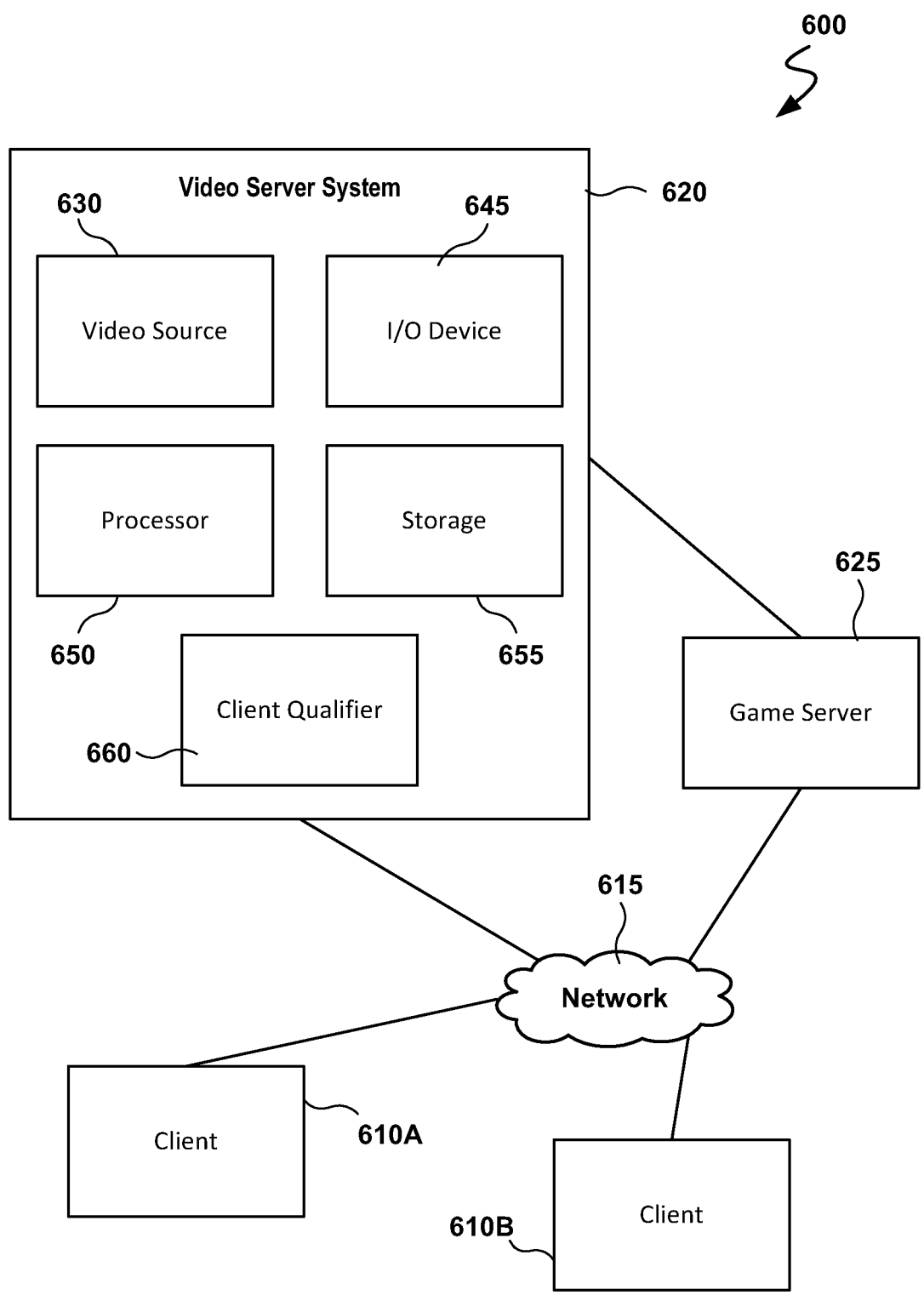
FIG. 9 is a block diagram of an embodiment of a game system, in accordance with one embodiment described in the present disclosure.

FIG. 9 is a block diagram of a game system 600, according to various embodiments described in the present disclosure. In some embodiments, the game system 600 is a cloud gaming system in which VMs, e.g., operating systems, software applications, etc., are executed using one or more resources, e.g., servers, memory devices, etc., after a relationship is established between the resources and the VMs by a hypervisor. The game system 600 is used to provide a video stream to one or more clients 610 via a network 615, which is an example of the network 110 (FIGS. 1A-1C, 2). The game system 600 includes a video server system 620 and an optional game server 625. The video server system 620 is used to provide the video stream to the one or more clients 610 with a quality of service. For example, the video server system 620 may receive a game command that changes the state of or a point of view within a video game, e.g., a game played by executing the game program 116 (FIGS. 1A-1C), etc., and provide clients 610 with an updated video stream reflecting this change in state with minimal lag time. The video server system 620 may be used to provide the video stream in a wide variety of alternative video formats, including formats yet to be defined. Further, the video stream may include video frames used for presentation to the user 108 (FIGS. 1A-1C, 2) at a wide variety of frame rates. Typical frame rates are 30 frames per second, 60 frames per second, and 620 frames per second. Although higher or lower frame rates are included in various embodiments described in the present disclosure.

The clients 610, referred to herein individually as 610A, 610B, etc., may include the HMD 104 (FIGS. 1A-1C, 2), the HHC 104 (FIGS. 1A-1C, 2), terminals, personal computers, game consoles, tablet computers, telephones, set top boxes, kiosks, wireless devices, digital pads, stand-alone devices, and/or the like. The clients 610 are used to receive encoded video streams, decode the video streams, and present the resulting video to the user 108, e.g., a player of a game. The processes of receiving encoded video streams and/or decoding the video streams includes storing individual video frames in a receive buffer of a client. The video streams may be presented to the user 108 on a display integral to the client 610 or on a separate device such as a monitor or television.

The clients 610 are optionally used to support more than one game player. For example, a game console may be used to support two, three, four or more simultaneous players. Each of these players may receive a separate video stream, or a single video stream may include regions of a frame generated specifically for each player, e.g., generated based on each player's point of view.

The clients 610 are optionally geographically dispersed. The number of clients included in the game system 600 may vary widely from one or two to thousands, tens of thousands, or more. As used herein, the term "game player" is used to refer to a person that plays a game and the term "game playing device" is used to refer to a device used to play a game, e.g., a game played by executing the game program 116 (FIGS. 1A-1C), etc. In some embodiments, the game playing device may refer to a plurality of computing devices that cooperate to deliver a game experience to the user 108. For example, a game console and the HMD 104 (FIGS. 1A-1C, 2) may cooperate with the video server system 620 to deliver a game viewed through the HMD 104. In one embodiment, the game console receives the video stream from the video server system 620, and the game console forwards the video stream, or updates to the video stream, to the HMD 104 for rendering.

The clients 610 are used to receive video streams via the network 615. The network 615 may be any type of communication network including, a telephone network, the Internet, wireless networks, powerline networks, local area networks, wide area networks, private networks, and/or the like. In some embodiments, the video streams are communicated via standard protocols, such as TCP/IP or UDP/IP. In a number of embodiments, the video streams are communicated via proprietary standards.

A typical example of one of the clients 610 is a personal computer including a processor, a non-volatile memory, a display, a decoding logic, network communication capabilities, and one or more input devices. The decoding logic may include hardware, firmware, and/or software stored on a non-transitory computer-readable medium.

The clients 610 may, but are not required to, further include systems used for modifying received video. For example, a client may be used to perform further rendering, to overlay one video image on another video image, to crop a video image, and/or the like. As another example, clients 610 may be used to receive various types of video frames, such as intra-coded picture (I-frames), predicted frames (P-frames) and bi-predictive picture frames (B-frames), and to process these frames into images for display of a game, e.g., a game played by executing the game program 116 (FIGS. 1A-1C), etc., to the user 108. In some embodiments, a component of clients 610 is used to perform further rendering, shading, conversion to 3-D, or like operations on the video stream. A component of clients 610 is optionally used to receive more than one audio or video stream.

Input devices of clients 610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream, and optionally audio stream, received by clients 610 is generated and provided by the video server system 620. This video stream includes video frames and the audio stream includes audio frames. The video frames that include pixel information in an appropriate data structure contribute meaningfully to the images displayed to the user 108. As used herein, the term "video frames" is used to refer to frames including predominantly information that is used to contribute, e.g. to effect, etc., to the images of a game, e.g., a game played by executing the game program 116 (FIGS. 1A-1C), etc., played by the user 108. Most of the teachings herein with regard to "video frames" can also be applied to "audio frames."

In various embodiments, the clients 610 are used to receive inputs from the user 108. These inputs may include game commands used to change the state of a video game, e.g., a game played by executing the game program 116 (FIGS. 1A-1C), etc., or otherwise affect game play. The game commands may be received using input devices, e.g., the user input circuit 262 (FIG. 4), etc., and/or may be automatically generated by computing instructions executing on clients 610. The received game commands are communicated from clients 610 via the network 615 to the video server system 620 and/or to the game server 625. For example, the game commands are communicated to the game server 625 via the video server system 620.

In some embodiments, separate copies of the game commands are communicated from the clients 610 to the game server 625 and the video server system 620.

The communication of game commands is optionally dependent on the identity of the command Game commands are optionally communicated from the client 610A through a different route or communication channel that that used to provide audio or video streams to the client 610A.

The game server 625 is optionally operated by a different entity than the video server system 620. For example, the game server 625 may be operated by a publisher of a game. In this example, the video server system 620 is optionally viewed as a client by the game server 625 and optionally used to appear from the point of view of the game server 625 to be a client executing a game engine. Communication between the video server system 620 and the game server 625 optionally occurs via the network 615. As such, the game server 625 may be a multiplayer game server that sends game state information to multiple clients, one of which is game server system 620.

The video server system 620 may be used to communicate with multiple instances of the game server 625 at the same time. For example, the video server system 620 may be used to provide a plurality of different video games to different users. Each of these different video games may be supported by a different the game server 625 and/or published by different entities.

In some embodiments, several geographically distributed instances of the video server system 620 are used to provide game video to a plurality of different users. Each of these instances of the video server system 620 may be in communication with the same instance of the game server 625.

Communication between the video server system 620 and one or more the game server 625 optionally occurs via a dedicated communication channel. For example, the video server system 620 may be connected to the game server 625 via a high bandwidth channel that is dedicated to communication between these two systems.

The video server system 620 includes at least a video source 630, an I/O device 645, a processor 650, and a storage 655. The video server system 620 may include one computing device or be distributed among a plurality of computing devices. These computing devices are optionally connected via a communications system such as a local area network.

The video source 630 is used to provide a video stream, e.g., streaming video or a series of video frames that form a moving picture. In some embodiments, the video source 630 includes a video game engine and rendering logic.

The video game engine is used to receive game commands from a player and to maintain a copy of the state of a video game, e.g., a game played by executing the game program 116 (FIGS. 1A-1C), etc., based on the received commands. This game state includes the position of objects in a game environment, as well as a point of view. The game state may also include properties, images, colors and/or textures of objects. The game state is maintained based on game rules, as well as game commands such as move, turn, attack, set focus to, interact, use, and/or the like. Part of the game engine is optionally disposed within the game server 625. The game server 625 may maintain a copy of the state of the game based on game commands received from multiple players using geographically disperse clients. In these cases, the game state is provided by the game server 625 to the video source 630, where a copy of the game state is stored and rendering is performed. The game server 625 may receive game commands directly from clients 610 via the network 615, and/or may receive game commands via the video server system 620.

The video source 630 includes rendering logic, e.g., hardware, firmware, and/or software stored on a non-transitory computer-readable medium such as the storage 655. This rendering logic is used to create video frames of the video stream based on the game state. All or part of the rendering logic is optionally disposed within a GPU. Rendering logic includes processing stages used for determining the three-dimensional spatial relationships between objects and/or for applying appropriate textures, etc., based on the game state and viewpoint. The rendering logic produces raw video that is then usually encoded prior to communication to clients 610. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device.

The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are smaller in data size than are I-frames. As used herein the term "frame size" is meant to refer to a number of pixels within a frame. The term "frame data size" is used to refer to a number of bytes required to store the frame.

In some embodiments, the video source 630 includes a video recording device such as a camera. This camera may be used to generate delayed or live video that may be included in the video stream of a computer game. The resulting video stream, optionally includes both rendered images and images recorded using a still or video camera. The video source 630 may also include storage devices used to store previously recorded video to be included in a video stream. The video source 630 may also include motion or positioning sensing devices used to detect motion or position of the HMD 104, the HHC 106, or the user 108 (FIGS. 1A-1C, 2), and logic used to determine a game state or produce video-based on the detected motion and/or position.

The video source 630 is optionally used to provide overlays used to be placed on other video. For example, these overlays may include a command interface, log in instructions, messages to a game player, images of other game players, video feeds of other game players (e.g., webcam video). In some embodiments of the client 610A including a touch screen interface or a gaze detection interface, the overlay may include a virtual keyboard, joystick, touch pad, and/or the like. In one example of an overlay a player's voice is overlaid on an audio stream. The video source 630 optionally further includes one or more audio sources.

In embodiments where the video server system 620 is used to maintain the game state based on input from more than one player, each player may have a different point of view including a position and direction of view. The video source 630 is optionally used to provide a separate video stream for each player based on their point of view. Further, the video source 630 may be used to provide a different frame size, frame data size, and/or encoding to each of the client 610. The video source 630 is optionally used to provide 3-D video.

The I/O device 645 is used for the video server system 620 to send and/or receive information such as video, commands, requests for information, a game state, gaze information, device motion, device location, user motion, client identities, player identities, game commands, security information, audio, and/or the like. The I/O device 645 includes communication hardware such as a network interface card or modem. The I/O device 645 is used to communicate with the game server 625, the network 615, and/or clients 610.

The processor 650 is used to execute logic, e.g. software, included within the various components of the video server system 620 discussed herein. For example, the processor 650 may be programmed with software instructions to perform the functions of the video source 630, the game server 625, and/or a client qualifier 660. The video server system 620 optionally includes more than one instance of the processor 650. The processor 650 may also be programmed with software instructions to execute commands received by the video server system 620, or to coordinate the operation of the various elements of the game system 600 discussed herein. The processor 650 may include one or more hardware device. The processor 650 is an electronic processor.

The storage 655 includes non-transitory analog and/or digital storage devices. For example, the storage 655 may include an analog storage device used to store video frames. The storage 655 may include a non-transitory computer-readable digital storage, e.g. a hard drive, an optical drive, or solid state storage. The storage 615 is used (e.g. by way of an appropriate data structure or file system) to store video frames, artificial frames, a video stream including both video frames and artificial frames, audio frame, an audio stream, and/or the like. The storage 655 is optionally distributed among a plurality of devices. In some embodiments, the storage 655 is used to store the software components of the video source 630 discussed elsewhere herein. These components may be stored in a format ready to be provisioned when needed.

The video server system 620 optionally further includes the client qualifier 660. The client qualifier 660 is used for remotely determining the capabilities of a client, such as clients 610A or 610B. These capabilities can include both the capabilities of the client 610A itself as well as the capabilities of one or more communication channels between the client 610A and the video server system 620. For example, the client qualifier 660 may be used to test a communication channel through the network 615.

The client qualifier 660 can determine (e.g., discover) the capabilities of the client 610A manually or automatically. Manual determination includes communicating with the user 108 of the client 610A and asking the user 108 to provide capabilities. For example, in some embodiments, the client qualifier 660 is used to display images, text, and/or the like within a web browser of the client 610A. In one embodiment, the client 610A is an HMD, e.g., the HMD 104, etc., that includes a web browser. In another embodiment, client 610A is a game console having a web browser, which may be displayed on the HMD. The displayed objects request that the user 108 enter information such as operating system, processor, video decoder type, type of network connection, display resolution, etc. of the client 610A. The information entered by the user 108 is communicated back to the client qualifier 660.

Automatic determination may occur, for example, by execution of an agent on the client 610A and/or by sending test video to the client 610A. The agent may include computing instructions, such as java script, embedded in a web page or installed as an add-on. The agent is optionally provided by the client qualifier 660. In various embodiments, the agent can find out processing power of the client 610A, decoding and display capabilities of the client 610A, lag time reliability and bandwidth of communication channels between the client 610A and the video server system 620, a display type of the client 610A, firewalls present on the client 610A, hardware of the client 610A, software executing on the client 610A, registry entries within the client 610A, and/or the like.

The client qualifier 660 includes hardware, firmware, and/or software stored on a non-transitory computer-readable medium. The client qualifier 660 is optionally disposed on a computing device separate from one or more other elements of the video server system 620. For example, in some embodiments, the client qualifier 660 is used to determine the characteristics of communication channels between clients 610 and more than one instance of the video server system 620. In these embodiments the information discovered by the client qualifier may be used to determine which instance of the video server system 620 is best suited for delivery of streaming video to one of clients 610.

In some embodiments, media data includes real-world environment data, virtual world environment data, or a combination thereof. The real-world environment data includes data generated from one or more images of real-world environment, e.g., real cars, real people, real geographic locations, real structures, real houses, real trees, real objects, real living things, real non-living things, etc. The real-world environment data is generated by a camera, e.g., a video camera, an audio camera, etc., when the camera captures images of the real-world environment. The virtual world environment data is data generated by a computer, e.g., a processor that executes the game program 117, etc.

In a number of embodiments, one or more users, e.g., the user 108, another user, etc., may interact with a virtual world. As used herein the term virtual world means a representation of a fictitious, e.g., virtual, computer-generated, etc., environment having rules of interaction simulated by one or more processors that a real user may perceive via one or more display screens and/or may interact with via one or more user interface devices. As used herein, the term user interface device refers to a real device e.g., the HMD 104, the HHC 106 (FIGS. 1A-1C, 2), etc., by which the user 108 may send inputs to or receive outputs from the virtual world. The virtual world may be simulated by one or more processor modules, e.g., one or more servers of the game cloud 102 (FIGS. 1A-1C, 2), the microcontroller 268 (FIG. 3), the processor 176 (FIG. 1C), etc. The one or more processor modules may be linked together via the network 110 (FIGS. 1A-1C, 2). The user 108 may interact with the virtual world via a user interface device that can communicate with the processor modules and other user interface devices via the network 110. Certain aspects of the virtual world may be presented to the user 108 in a graphical form on a graphical display screen, such as, for example, a computer monitor, a television monitor, the display screen 266, a display screen of the HHC 106, or similar display. Certain other aspects of the virtual world may be presented to the user in audible form on a speaker, e.g., the speakers 260 (FIG. 3), etc., which may be associated with the graphical display.

Within the virtual world, users may be represented by avatars. Each avatar within the virtual world may be uniquely associated with a different user. The name or pseudonym of the user 108 may be displayed next to the avatar so that the user 108 is readily identified by another user. Interactions of the user 108 with the virtual world may be represented by one or more corresponding actions of the avatar. For example, when the user 108 performs the head actions, the avatar performs the same head action. As another example, when the user 108 performs the hand actions, the avatar performs the same hand actions in the virtual world. Different users may interact with each other in a virtual public space, e.g., a virtual geographic region, etc., via their avatars. An avatar representing the user 108 could have an appearance similar to that of a person, an animal or an object. An avatar in the form of a person may have the same gender as the user 108 or a different gender. The avatar may be shown on a display screen, e.g., the display screen 266 (FIG. 3), the display screen 544 (FIG. 8), a display screen of the HHC 106 (FIGS. 1A-1C), the display screen of the computer 172 (FIG. 1C), etc., so that the user 108 can see the avatar along with other objects in the virtual world.

In various embodiments, a display screen, e.g., the display screen 266 (FIG. 3), the display screen 544 (FIG. 8), a display screen of the HHC 106 (FIGS. 1A-1C), the display screen of the computer 172 (FIG. 1C), etc., may show the virtual world from a point of view of the avatar without showing the avatar. A perspective of the avatar on the virtual world may be thought of as being a view of a virtual camera. As used herein, a virtual camera refers to a point of view within the virtual world that may be used for rendering two-dimensional images of a three-dimensional scene within the virtual world. Users may interact with each other through their avatars by chat channels associated with each lobby. Users may enter text for chat with other users via their user interface. The text may then appear over or next to the user's avatar, e.g., in the form of comic-book style dialogue bubbles, sometimes referred to as chat bubbles. Such chat may be facilitated by the use of a canned phrase chat system sometimes referred to as quick chat. With quick chat, the user 108 may select one or more chat phrases from a menu.

In some embodiments, the public space is public in the sense that the public space is not uniquely associated with any particular user or group of users and no user or group of users can exclude another user from the public space. A private space, by contrast, is associated with a particular user from among a plurality of users. A private space is private in the sense that the particular user associated with the private space may restrict access to the private space by other users. The private spaces may take on the appearance of familiar private real estate. In other embodiments, users need not be controlling the avatars seen on a display screen, e.g., the display screen 266 (FIG. 3), the display screen 544 (FIG. 8), a display screen of the HHC 106 (FIGS. 1A-1C), the display screen of the computer 172 (FIG. 1C), etc. Avatars shown in the virtual space may be bots that are controlled by a machine, e.g., a processor, etc. Avatar bots, therefore, can move around the virtual space in a similar way as do the avatars that are controlled by the user 108, however, no real-world user is actually controlling the avatar bots. In many ways, the avatar bots can roam around a space, take actions, post messages, assign privileges for certain messages, interact with other avatar bots or avatars controlled by real-world users, etc. Still further, the bots can be set to interact in defined manners, modify environments, post advertising, post messages, build virtual spaces, virtual buildings, or construct virtual objects, graphical representations of objects, exchange real or virtual money, etc.

Embodiments described in the present disclosure may be practiced with various computer system configurations including hand-held devices, microprocessor systems, microprocessor-based or programmable consumer electronics, minicomputers, mainframe computers and the like. Several embodiments described in the present disclosure can also be practiced in distributed computing environments where tasks are performed by remote processing devices that are linked through a wire-based or wireless network.

With the above embodiments in mind, it should be understood that a number of embodiments described in the present disclosure can employ various computer-implemented operations involving data stored in computer systems. These operations are those requiring physical manipulation of physical quantities. Any of the operations described herein that form part of various embodiments described in the present disclosure are useful machine operations. Several embodiments described in the present disclosure also relates to a device or an apparatus for performing these operations. The apparatus can be specially constructed for the required purpose, or the apparatus can be a computer selectively activated or configured by a computer program stored in the computer. In particular, various machines can be used with computer programs written in accordance with the teachings herein, or it may be more convenient to construct a more specialized apparatus to perform the required operations.

Various embodiments described in the present disclosure can also be embodied as computer-readable code on a non-transitory computer-readable medium. The non-transitory computer-readable medium is any data storage device that can store data, e.g., a RAM, a ROM, a flash memory, a disk, etc., which can be thereafter be read by a computer system. Examples of the computer-readable medium include hard drives, network attached storage (NAS), ROM, RAM, compact disc-ROMs (CD-ROMs), CD-recordables (CD-Rs), CD-rewritables (RWs), magnetic tapes and other optical and non-optical data storage devices. The non-transitory computer-readable medium can include computer-readable tangible medium distributed over a network-coupled computer system so that the computer-readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, or operations may be performed in a different order, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the various embodiments described in the present disclosure is not to be limited to the details given herein, but may be modified within the scope and equivalents of the appended claims.

The invention claimed is:

1. A head mounted display comprising:
an external camera configured to capture images of a real-world environment including a hand-held controller in front of the head mounted display, wherein the hand-held controller includes a plurality of markers, wherein the images are configured for examination to determine positions and movements of the plurality of markers on the hand-held controller with respect to the external camera of the head mounted display;
a communications circuit coupled to the external camera, wherein the communications circuit is located within the head mounted display to receive the images from the external camera and encode the images to output a plurality of encoded images, wherein the plurality of encoded images provide the positions and movements of the plurality of markers on the hand-held controller with respect to the external camera,
wherein the communications circuit is configured to send the plurality of encoded images via the Internet to a cloud system without using a computer between the head mounted display and the Internet, wherein the communications circuit is configured to receive packets of compressed interactive media frames via the Internet without using the computer, wherein the compressed interactive media frames are generated by the cloud system based on the positions and movements provided by the plurality of encoded images; and
a display device configured to display a virtual scene based on image data provided by the compressed interactive media frames.

2. The head mounted display of claim 1, wherein the plurality of encoded images includes information regarding movement of the head mounted display within the real-world environment.

3. The head mounted display of claim 1, wherein the plurality of encoded images are a plurality of compressed images, wherein the plurality of compressed images are decompressed by the cloud system.

4. The head mounted display of claim 1, wherein the computer is a game console or a mobile phone or a table, wherein the computer is configured to execute an interactive game program to generate one or more image frames for display on a display device.

5. The head mounted display of claim 1, wherein the compressed interactive media frames include I frames and P frames, wherein the head mounted display includes a decoder, wherein the decoder is configured to decompress the I frames and P frames to output a plurality of decoded image frames for display of the virtual scene on the display device.

6. The head mounted display of claim 1, wherein the cloud system is configured to decompress the plurality of encoded images to output the images of the real-world environment, wherein the cloud system is configured to determine a plurality of game states based on the images of the real-world environment, wherein the cloud system is configured to generate additional images based on the plurality of game states, wherein the cloud system is configured to compress the additional images to generate the compressed interactive media frames.

7. The head mounted display of claim 1, wherein the external camera is a digital camera, wherein the communications circuit is a wireless access circuit that is configured to facilitate the head mounted display to communicate with the Internet without using the computer.

8. The head mounted display of claim 1, further comprising:
an internal camera configured to face eyes of a user wearing the head mounted display, wherein the internal camera is configured to capture movement of the eyes of the user to generate a set of images,
wherein the communications circuit is configured to encode the set of images to output a set of encoded images,
wherein the communications circuit is configured to send the set of encoded images via the Internet to the cloud system without using the computer.

9. The head mounted display of claim 8, wherein the set of encoded images and the plurality of encoded images are decompressed by the cloud system to output a group of images, wherein the group of images are used by the cloud system to generate a plurality of media frames, wherein the plurality of media frames are encoded by the cloud system to generate the compressed interactive media frames.

10. A system comprising:
a plurality of servers; and
a head mounted display coupled to the plurality of servers via a computer network without using a computer between the head mounted display and the computer network, the head mounted display including:
an external camera configured to capture images of a real-world environment including a hand-held controller in front of the head mounted display, wherein the hand-held controller includes a plurality of markers, wherein the images are configured for examination to determine positions and movements of the plurality of markers on the hand-held controller with respect to the external camera of the head mounted display; and
a communications circuit coupled to the external camera, wherein the communications circuit is located within the head mounted display to receive the images from the external camera and encode the images to output a plurality of encoded images, wherein the plurality of encoded images provide the positions and movements of the plurality of markers on the hand-held controller with respect to the external camera,
wherein the communications circuit is configured to send the plurality of encoded images via the computer network to the plurality of servers without using the computer, wherein the plurality of servers are configured to generate a plurality of compressed interactive media frames based on the positions and movements provided by the plurality of encoded images, wherein the plurality of servers are configured to send a plurality of packets including the plurality of compressed interactive media frames via the computer network to the head mounted display, wherein the communications circuit is configured to receive the plurality of packets of the plurality of compressed interactive media frames via the computer network without using the computer, wherein the head mounted display includes a display device configured to display a virtual scene based on image data provided by the compressed interactive media frames.

11. The system of claim 10, wherein the plurality of encoded images include information regarding movement of the head mounted display within the real-world environment.

12. The system of claim 10, wherein the plurality of encoded images are a plurality of compressed images, wherein the plurality of servers are configured to decompress the plurality of compressed images.

13. The system of claim 10, wherein the computer is a game console or a mobile phone or a table, wherein the computer is configured to execute an interactive game program to generate one or more image frames for display on a display device.

14. The system of claim 10, wherein the head mounted display comprises:
a decoder coupled to the display device,
wherein the plurality of compressed interactive media frames include I frames and P frames, wherein the decoder is configured to decompress the I frames and P frames to output a plurality of decoded image frames for display of the virtual scene on the display device.

15. The system of claim 10, wherein the plurality of servers are configured to decompress the plurality of encoded images to output the images of the real-world environment, wherein the plurality of servers are configured to determine a plurality of game states based on the images of the real-world environment, wherein the plurality of servers are configured to generate additional images based on the plurality of game states, wherein the plurality of servers are configured to compress the additional images to generate the plurality of compressed interactive media frames.

16. The system of claim 10, wherein the external camera is a digital camera, wherein the communications circuit is a wireless access circuit that is configured to be facilitate the head mounted display to communicate with the computer network without using the computer.

17. The system of claim 10, wherein the head mounted display further comprises an internal camera configured to face eyes of a user wearing the head mounted display, wherein the internal camera is configured to capture movement of the eyes of the user to generate a set of images,
wherein the communications circuit is configured to encode the set of images to output a set of encoded images,
wherein the communications circuit is configured to send the set of encoded images via the computer network to the plurality of servers without using the computer.

18. The system of claim 17, wherein the plurality of servers are configured to decompress the set of encoded images and the plurality of encoded images to output a group of images, wherein the plurality of servers are configured to determine a plurality of game states based on the group of images, wherein the plurality of servers are configured to generate a plurality of media frames based on the plurality of game states, wherein the plurality of servers are configured to encode the plurality of media frames to generate the plurality of compressed interactive media frames.

19. A method comprising:
capturing, by an external camera of a head mounted display, images of a real-world environment including a hand-held controller in front of the head mounted display, wherein the hand-held controller includes a plurality of markers, wherein the images are configured for examination to determine positions and movements of the plurality of markers on the hand-held controller with respect to the external camera of the head mounted display;
receiving, by a communications circuit of the head mounted display, the images from the camera;
encoding, by the communications circuit of the head mounted display, the images to output a plurality of encoded images, wherein the plurality of encoded images provide the positions and movements of the plurality of markers on the hand-held controller with respect to the external camera;
sending, from the head mounted display, the plurality of encoded images via the Internet to a cloud system without using a computer between the head mounted display and the Internet;
receiving, by the head mounted display, packets of compressed interactive media frames via the Internet from the cloud system without using the computer, wherein the compressed interactive media frames are generated by the cloud system based on the positions and movements provided by the plurality of encoded images; and
displaying a virtual scene based on image data provided by the compressed interactive media frames.

20. The method of claim 19, wherein the plurality of encoded images include information regarding movement of the head mounted display within the real-world environment.

21. The head mounted display of claim 1, wherein the communications circuit is configured to be worn by a user and is configured to be used with the hand-held controller, wherein the hand-held controller is configured to be held by the user to generate input data, wherein the compressed interactive media frames are generated by the cloud system based on the input data.

22. The head mounted display of claim 1, wherein the cloud system is configured to determine a position and motion of the head mounted display in the real-world environment based on the images, and generate the compressed interactive media frames based on the position and motion.

23. The head mounted display of claim 1, wherein the communications circuit is configured to send the plurality of encoded images to a router coupled to the Internet.

24. The head mounted display of claim 1, wherein the virtual scene includes images of a virtual object having positions and movements that change based on the positions and movements of the hand-held controller with respect to the external camera, wherein the virtual scene has a plurality of portions, wherein the display device is configured to display a different one of the plurality of portions based on positions and movements of the external camera.

25. The head mounted display of claim 1, wherein the image data includes virtual positions and movements of a virtual object, wherein the cloud system is configured to generate the virtual positions and movements of the virtual object based on the positions and movements of the hand-held controller with respect to the external camera, wherein the image data includes a plurality of portions of a virtual scene, wherein the display device is configured to display a different one of the plurality of portions based on positions and movements of the external camera.

26. The head mounted display of claim 1, wherein the plurality of markers include a plurality of light emitting diodes, or a plurality of light sources, or a plurality of colors, or a plurality of reflective materials.

27. The head mounted display of claim 1, wherein the plurality of markers include an illuminated section on the hand-held controller.

28. The head mounted display of claim 27, wherein the illuminated section is spherical.

* * * * *